(12) United States Patent  
Usami

(10) Patent No.: US 6,389,522 B1  
(45) Date of Patent: May 14, 2002

(54) SIGNAL CONTROL CIRCUIT FOR CONTROLLING SIGNALS TO AND FROM A SUBSIDIARY PROCESSING CIRCUIT

(75) Inventor: Hajime Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/204,551

(22) Filed: Dec. 3, 1998

(30) Foreign Application Priority Data

Dec. 4, 1997 (JP) .............................................. 9-334339

(51) Int. Cl.$^7$ .............................................. G60F 13/18
(52) U.S. Cl. ........................ 711/167; 711/168; 711/169
(58) Field of Search ........................ 365/189.07, 189.02; 711/167, 168, 169

(56) References Cited

U.S. PATENT DOCUMENTS

| | | | | |
|---|---|---|---|---|
| 4,494,222 A | * | 1/1985 | White et al. ................. | 365/222 |
| 4,519,028 A | * | 5/1985 | Olsen et al. ................. | 713/600 |
| 4,539,658 A | * | 9/1985 | Shimohigashi .............. | 365/207 |
| 4,912,678 A | * | 3/1990 | Mashiko ...................... | 365/222 |
| 5,473,616 A | * | 12/1995 | Tsutsui et al. .............. | 371/201 |
| 5,572,467 A | * | 11/1996 | Ghassemi et al. ...... | 365/189.02 |

* cited by examiner

*Primary Examiner*—Reba I. Elmore  
(74) *Attorney, Agent, or Firm*—Oliff & Berridge, PLC

(57) ABSTRACT

The comparator 31 in the address control circuit 30 compares the present address signal, presently outputted from the CPU 10, with the preceding address signal that is being presently maintained in the maintaining portion 32. When the number of bits, at which the present address signal changes from the preceding address signal, is greater than or equal to the reference value, and when the bit pattern in the present address signal coincides with the reference bit pattern, the falling edge timing of the column address strobe signal CAS, which is outputted from the memory controller 33 to the DRAM 20, is delayed, whereby the address signal reading timing of the DRAM 20 is delayed. Even when all the bits in the address simultaneously change and therefore noise occurs, error will not occur in the input or output of the address signal.

25 Claims, 13 Drawing Sheets

SIGNAL CONTROL CIRCUIT FOR CONTROLLING SIGNALS TO AND FROM A SUBSIDIARY PROCESSING CIRCUIT

BACKGROUND OF THE INVENTION

1. Field of Invention

The present invention relates to a signal control circuit used in a circuit or device for communicating data, address, control signals via bus between a main processing circuit, such as a central processing unit CPU, and a subsidiary processing circuit, such as a memory circuit or an input-output circuit. More particularly, the present invention relates to a signal control circuit for controlling input/output of data, address, control signals to and from the subsidiary processing circuit.

2. Description of Related Art

Various electronic devices, control devices are provided with a device or system for controlling bus signals such as data, address, and control signals. The bus signal controlling device includes a main processing circuit, such as a CPU, and a subsidiary processing circuit, such as a memory circuit, an input/output circuit. In the bus signal controlling device, the main processing circuit is connected to the subsidiary processing circuit via a bus. The bus signal controlling device controls input/output of bus signals between the main processing circuit and the subsidiary processing circuit.

For example, a data storage device is widely used in computers, printers. The data storage device includes a CPU and a memory circuit, such as a random access memory (RAM), a read only memory (ROM). The CPU and the memory circuit are mounted on a single substrate, and are connected with each other via address bus, data bus, and control signal lines. The data storage device serves to perform data processing operation such as data storage processing between the CPU and the memory circuit. Each set of bus signals, used in the above-described device, is a digital signal constructed from a plurality of bits.

In recent years, in order to improve the performance of the computers printers, the operation speeds and data processing abilities of the main processing circuit and the subsidiary processing circuit are greatly enhanced. The operation speed of the CPU is greatly enhanced. The capacity of the memory circuit is greatly increased.

SUMMARY OF THE INVENTION

When the operation speeds and the data processing abilities of the main processing circuit and of the subsidiary processing circuit are enhanced, the number of bits constituting each set of bus signals, transferred between the main processing circuit and the subsidiary processing circuit, is also increased. Input/output rate of the bus signals between the main processing circuit and the subsidiary processing circuit is also increased.

When the data processing ability of the CPU is enhanced and the capacity of the memory circuit is increased, for example, the number of bits constituting each set of data and each set of address that are transferred between the CPU and the memory circuit is increased. When the operation speed of the CPU is increased and the reading/writing frequency of the memory circuit is increased, the input/output rate of data and address between the CPU and the memory circuit is increased.

When the number of bits constituting each set of bus signals is increased and the input/output rate of the bus signals is increased, bus signals comprised of a large number of bits are repeatedly and frequently transferred between the main processing circuit and the subsidiary processing circuit. Accordingly, bus signals, having the large number of bits, rapidly change in the bus that connects the main processing circuit and the subsidiary processing circuit.

At an instant when a bus signal having a large number of bits rapidly changes, noise will possibly occur within the bus signal. Especially when all of the bits constituting the bus signal simultaneously rise or fall to the same binary state, noise will highly possibly occur in the bus signal. Immediately after a ten-bit address bus signal changes from "0000000000b" to "1111111111b", for example, noise will possibly occur in the address bus signal. As a result, a non-stable address signal, influenced from the noise, is inputted to the main processing circuit or to the subsidiary processing circuit. The main processing circuit or the subsidiary processing circuit will possibly detect the received inaccurate address bus signal.

Especially when the memory circuit is constructed from dynamic RAM (which will be referred to simply as DRAM hereinafter), the above-described problem occurs highly likely. The DRAM is a memory circuit that can perform data reading/writing operation rapidly. Especially when the DRAM is used in a so-called page mode, the data reading/writing operation can be performed more rapidly. When performing the rapid data reading/writing operation onto the DRAM, if all the bits constituting each set of data or each set of address signal change simultaneously, noise will highly possibly occur in the data or the address signal. It is noted that during the page mode, a row address is first outputted to the DRAM. Thereafter, a plurality of column addresses are successively outputted to the DRAM, whereby a corresponding plurality of addresses in the single page can be designated.

In order to restrain the above-described noise, it is conceivable to construct the circuit substrate, on which the main processing circuit, the subsidiary processing circuit, and the bus are mounted, into a multilayered structure, thereby increasing a thickness of a pattern for a zero (0) volt (ground voltage) and increasing a ground strength of the circuit substrate. When the circuit substrate is thus constructed in the multi-layered structure, however, the cost required for producing the entire device increases.

The noise can be restrained also when the input/output rate of the bus signal between the main processing circuit and the subsidiary processing circuit is decreased. However, this leads to drop in the entire processing speed of the main processing circuit and the subsidiary processing circuit.

In view of the above-described drawbacks, the present invention is attained to provide an improved signal control circuit that enables input/output of bus signals in accuracy and at a high speed through preventing the bus signals from being inaccurately detected even when noise occurs in the bus signals due to simultaneous changes of the bits located therein.

In order to attain the above and other objects, the present invention provides a signal control circuit for outputting, to a subsidiary processing circuit, control signals for controlling input and output of bus signals with respect to the subsidiary processing circuit, the bus signals being transferred or inputted/outputted via a bus between the subsidiary processing circuit and a main processing circuit, the signal control circuit comprising: a comparing portion that compares at least a bit in at least a predetermined portion of a present bus signal, which is transferred between a main processing circuit and a subsidiary processing circuit at a present timing with corresponding at least a bit in at least a predetermined portion of a preceding bus signal, which is transferred between the main processing circuit and the subsidiary processing circuit at a preceding timing; and an output control portion that delays outputting, to the subsidiary processing circuit, a control signal for controlling input and output of the bus signal when the compared result shows that a predetermined difference occurs between the present bus signal and the preceding bus signal.

More specifically, the main processing circuit and the subsidiary processing circuit are connected with each other via bus. Bus signal is outputted and inputted between the main processing circuit and the subsidiary processing circuit. The bus signal may be a digital signal comprised from a plurality of bits. The input/output of the bus signal indicates either one or both of: output of the bus signal from the main processing circuit to the subsidiary processing circuit; and output of the bus signal from the subsidiary processing circuit to the main processing circuit. Representative examples of the main processing circuit include: a superordinate control circuit such as CPU and MPU; and all other circuits that output digital signals comprised from a plurality of bits. Representative examples of the subsidiary processing circuit include: memory circuits; input/output circuits; and all other circuits that receive and output digital signals comprised from a plurality of bits. The bus is constructed from at least one signal line for executing input/output of bus signals between the main processing circuit and the subsidiary processing circuit.

The signal control circuit outputs, to the subsidiary processing circuit, a control signal for controlling input/output of the bus signal. Representative examples of the control signal are: a signal for setting a timing when the subsidiary processing circuit receives a bus signal; a signal for setting a timing when the subsidiary processing circuit stores the bus signal therein; a signal for setting a timing when the subsidiary processing circuit outputs the bus signal to the main processing circuit.

The signal control circuit includes the comparing portion and the output control portion. The comparing portion is for comparing at least a bit located in at least a predetermined portion of all the bits constituting a present bus signal, that is inputted/outputted between the main processing circuit and the subsidiary processing circuit at a present timing, with at least a bit located in at least a predetermined portion of all the bits constituting a preceding bus signal, that has been inputted/outputted between the main processing circuit and the subsidiary processing circuit at a timing preceding to the present timing. Here, the "at least one bit in at least the predetermined portion of all the bits constituting the bus signal" indicates at least one bit constituting a part of all the bits in the bus signal or at least one bit constituting the entire part of all the bits in the bus signal.

The output control portion delays output of the control signal from the signal control circuit to the subsidiary processing circuit when the predetermined difference occurs between the preceding bus signal and the present bus signal. By thus delaying the control signal, it is possible to delay the timing when the subsidiary processing circuit receives the bus signal or the timing when the subsidiary processing circuit outputs the bus signal to the main processing circuit.

When a plurality of bits in the bus signal simultaneously change from the preceding bus signal to the present bus signal, undesirable noise possibly occurs in the bus signal. The noise occurs immediately after the preceding bus signal changes to the present bus signal. The noise vanishes after a short period of time elapses. This short period of time is shorter than a period, at which the bus signal is repeatedly inputted to or outputted from the subsidiary processing circuit. By delaying the timing when the subsidiary processing circuit receives the bus signal or the timing when the subsidiary processing circuit outputs the bus signal to the main processing circuit, the subsidiary processing circuit can perform its bus signal receiving/outputting operation after the period of time when the noise occurs in the bus signal. The subsidiary processing circuit can therefore perform its bus signal input/output operation at timings safely shifted from the period of time when the noise occurs. It is therefore possible to prevent the subsidiary processing circuit from inputting/outputting inaccurate bus signals due to noise occurring in the bus signals.

It is preferable that the output control portion may delay the output of the control signal when at least one bit, at which the at least the predetermined portion of the present bus signal is different from the at least the predetermined portion of the preceding bus signal, has a bit pattern coinciding with a predetermined reference bit pattern.

As described already, when the plurality of bits simultaneously change from the preceding bus signal to the present bus signal, noise will possibly occur in the bus signal. Such noise may possibly occur only when the bits, at which the present signal changes from the preceding bus signal, present either one of a limited number of reference bit patterns.

In this respect, it is preferable that each of the reference bit patterns be previously determined so that noise will occur when the bus signal changes from the preceding bus signal to the present bus signal in that reference bit pattern. When bits, at which the present bus signal changes from the preceding bus signal, have the reference bit pattern, the control signal, to be outputted from the signal control circuit to the subsidiary processing circuit, is delayed. The subsidiary control circuit can therefore receive/output bus signals at appropriate timings that are safely shifted from the noise occurring time period. It is noted that a single reference bit pattern may be previously determined. Or, a plurality of reference bit patterns may be previously determined.

It is preferable that the output control portion may delay the output of the control signal when the number of bits, at which the at least the predetermined portion of the present bus signal is different from the at least predetermined portion of the preceding bus signal, is greater than or equal to a predetermined reference value.

Noise will possibly occur in the bus signal when a plurality of bits simultaneously change from the preceding bus signal to the present bus signal. It is noted, however, that there is a little possibility that noise will occur if only a small number of bits, such as two or three bits, simultaneously change from the preceding bus signal to the present bus signal. Contrarily, noise highly possibly occurs in the bus signal if a large number of bits simultaneously change. That is, noise highly possibly occurs if the number of the simultaneously-changing bits is large to some degree. Considering this fact, the reference value is set previously. When the number of bits, at which the bus signal changes from the preceding bus signal to the present bus signal, is greater than or equal to the reference value, the control signal is delayed being outputted from the signal control circuit to the subsidiary processing circuit. The subsidiary processing circuit can therefore perform its bus signal receiving operation, its bus signal outputting operation at timings that are properly shifted from the period of time when noise occurs.

It is preferable that the output control portion may delay the output of the control signal when all the bits in the predetermined portion of the present bus signal are different from the corresponding all the bits in the predetermined portion of the preceding bus signal.

Noise will possibly occur in the bus signal immediately after all the bits constituting the predetermined portion of the bus signal changes from the preceding bus signal to the present bus signal. In this case, the control signal is delayed being outputted from the signal control circuit to the subsidiary processing circuit. Thus, the subsidiary control circuit can perform its bus signal receiving/outputting operation at timings safely shifted from the noise occurring time period.

It is preferable the signal control circuit may further include a reference bit pattern changing portion that changes the predetermined reference bit pattern based on a reference bit pattern setting signal inputted from outside.

It is conceivable to change the bus, to be used, after the signal control circuit is produced. It is also conceivable not to use a part of the bus after the signal control circuit is produced. Which bit pattern change in the bus signal is liable to produce noise depends on: the ground strength of the circuit substrate, on which the signal control circuit and the subsidiary processing, circuit are mounted; and how the bus is arranged on the circuit substrate. In this respect, it is preferable to set the reference bit pattern as suitable for actual use through changing the reference bit pattern according to the instruction inputted from outside.

It is preferable that the signal control circuit may further include a reference value changing portion that changes the predetermined reference value based on a reference value setting signal inputted from outside.

As described above, noise will possibly occur in the bus signal when the number of bits that change simultaneously is large to some extent. It is, however, conceivable to change the bus to be used after the signal control circuit is produced. It is also conceivable not to use a part of the bus after the signal control circuit is produced. Whether noise occurs or not depends on: the ground strength of the circuit substrate, on which the signal control circuit, the subsidiary processing circuit are mounted; and how the bus is arranged on the circuit substrate. In this respect, it is preferable to set the reference value as suitable for actual use through changing the reference value according to the instruction inputted from outside.

It is preferable that the signal control circuit may further include a delay time period changing portion that changes a period of delay time, by which the output control portion delays the output of the control signal, based on a delay time period setting signal inputted from outside.

As described above, noise will possibly occur immediately after the preceding bus signal changes into the present bus signal. The noise then vanishes after a short period of tame elapses, where the short period of time is shorter than a time period, at which the bus signals are repeatedly inputted and outputted at the subsidiary processing circuit. The period of time where the noise remains depends on: the ground strength of the circuit substrate, on which the signal control circuit, the subsidiary processing circuit are mounted; how the bus is arranged on the circuit substrate; and the operation speed of the subsidiary processing circuit. In this respect, it is preferable to set the delay time as suitable for actual use through changing, according to the instruction from outside, the amount of time that output of the control signal is to be delayed.

It is preferable that the signal control circuit may further include a comparing bit changing portion that changes, based on a bit setting signal inputted from outside, at least one bit in the preceding bus signal and at least one bit in the present bus signal as subjects to be compared by the comparing portion.

As described above, the comparator in the signal control circuit compares at least a bit in at least the predetermined portion of all the bits in the preceding bus signal with at least a bit in at least the predetermined portion of all the bits in the present bus signal. Those bits in the bus signal that should be subjected to the comparing operation should be changed according to the actual use. It is therefore preferable that a part in the bits of the preceding bus signal and a part in the bits of the present bus signal, to be subjected to the comparing operation, be changed according to the instruction inputted from outside. That is, the bit numbers of the bits or the range of the bits, in each of the preceding bus signal and the present bus signal, to be subjected to the comparing operation is changed according to the instruction inputted from outside. The bus signal comparing operation can therefore be achieved as suitable for actual use.

According to another aspect, the present invention provides a signal control circuit, provided between a main processing circuit for outputting an address signal to designate an address and a dynamic RAM that performs data reading operation and data writing operation to the address designated by the address signal outputted from the main processing circuit, and being for receiving the address signal from the main processing circuit, for dividing the address signal into row address and column address, for outputting the row address and column address in a predetermined order to the dynamic RAM while outputting, to the dynamic RAM, a control signal for controlling timings when the dynamic RAM reads the row address and the column address, the control signal circuit comprising: a comparing portion that compares, when column address, included in a present address signal outputted from the main processing circuit at a present time, is to be outputted subsequent to row address included in the present address signal, each bit at least in a predetermined portion of the column address with a corresponding bit at least in the predetermined portion of the row address, and that compares, when column address, included in the present address signal, is to be outputted subsequent to another column address included in a preceding address signal that is outputted from the main processing circuit at a preceding time, each bit at least in a predetermined portion of the column address included in the present address signal with a corresponding bit at least in the predetermined portion of the column address included in the preceding address signal; and an output control portion that delays outputting a control signal when the compared results show that a predetermined difference occurs between the addresses compared by the comparing portion.

In the above-described structure, the signal control circuit divides the address signal, outputted from the main processing circuit, into row address and column address, and outputs, to the dynamic RAM, the row address and the column address in the previously-set order. For example, the signal control circuit outputs the row address and the column address in alternation. Or, the signal control circuit may successively output column addresses after outputting a row address only once. The dynamic RAM reads the row address and the column address at timings when the dynamic RAM receives a control signal outputted from the signal controlling circuit.

When the signal control circuit outputs the column address, included in the present address signal, next to the row address included in the same present address signal, the comparing portion compares each bit at least in the predetermined portion of the column address with a corresponding bit at least in the predetermined portion of the row address. When the predetermined difference occurs between the row address and the column address, the output control portion delays outputting the control signal from the signal control circuit to the dynamic RAM.

When the signal control circuit outputs the column address, included in the present address signal, next to the column address included in the preceding address signal, the comparing portion compares each bit at least in the predetermined portion of the column address included in the present address signal with a corresponding bit at least in the predetermined portion of the column address included in the preceding address signal. When the predetermined difference occurs between the column addresses, the output control portion delays outputting the control signal from the signal control circuit to the dynamic RAM.

Thus, two successive addresses, that are successively outputted from the signal control circuit to the dynamic RAM, are compared with each other. Based on the compared results, output of the control signal is delayed. With this control, the dynamic RAM can read address signals at timings that are properly shifted from the period of time where noise occurs. It is possible to prevent the dynamic RAM from being designated with inaccurate addresses.

According to another aspect, the present invention provides a signal control system, comprising: a main processing circuit for mainly processing a bus signal; a subsidiary processing circuit capable of communicating the bus signals with the main processing circuit via a bus; and a signal control circuit, provided between the main processing circuit and the subsidiary processing circuit, the signal control circuit including: means for receiving the bus signals that are successively inputted to or outputted from the subsidiary processing circuit, and means for outputting control signals to the subsidiary processing circuit, thereby controlling at least one of input and output of the bus signals to and from the subsidiary processing circuit; and means for comparing at least a predetermined portion in all of a plurality of bits constituting a present bus signal, which is inputted to or outputted from the subsidiary processing circuit at a present timing, with at least the predetermined portion in all of a plurality of bits constituting a preceding bus signal, which is inputted to or outputted from the subsidiary processing circuit at a timing preceding to the present timing, the comparing means instructing the control signal outputting means to delay output of the control signal, for controlling a corresponding one of input and output of the present bus signal, to the subsidiary processing circuit when the compared result shows that a predetermined difference occurs between the present bus signal and the preceding bus signal.

According to still another aspect, the present invention provides a dynamic RAM control system, comprising: a main processing circuit for outputting an address signal to designate an address; a dynamic RAM that performs data reading operation and data writing operation to the address designated by the address signal outputted from the main processing circuit; and a signal control circuit, provided between the main processing circuit and the dynamic RAM, for receiving the address signal from the main processing circuit, the signal control circuit including: means for receiving address signals successively outputted from the main processing circuit, for dividing each received address signal into row address and column address, for outputting at least one of the row address and the column address in a predetermined order to the dynamic RAM, while outputting, to the dynamic RAM, a control signal for controlling a timing when the dynamic RAM reads the outputted at least one of the row address and the column address; and means for, when the output means outputs column address, included in a present address signal that is received from the main processing circuit at a present time, next to row address included also in the present address signal, comparing each bit at least in a predetermined portion of the column address with a corresponding bit at least in the predetermined portion of the row address, and for, when the output means outputs column address, included in the present address signal, next to another column address included in a preceding address signal that is outputted from the main processing circuit at a timing preceding to the present timing, comparing each bit at least in a predetermined portion of the column address included in the present address signal with a corresponding bit at least in the predetermined portion of the column address included in the preceding address signal, the comparing means outputting a delay request signal to the output means when the compared results show that a predetermined difference occurs between the addresses compared by the comparing portion, thereby controlling the output means to delay outputting the control signal for controlling a timing when the dynamic RAM is to read the column address that is included in the present address signal.

DETAILED DESCRIPTION OF PREFERRED EMBODIMENTS

A signal control circuit according to preferred embodiments of the present invention will be described while referring to the accompanying drawings.

First Embodiment

The signal control circuit according to a first embodiment of the present invention will be described below while referring to FIGS. 1–6.

Figure 1:
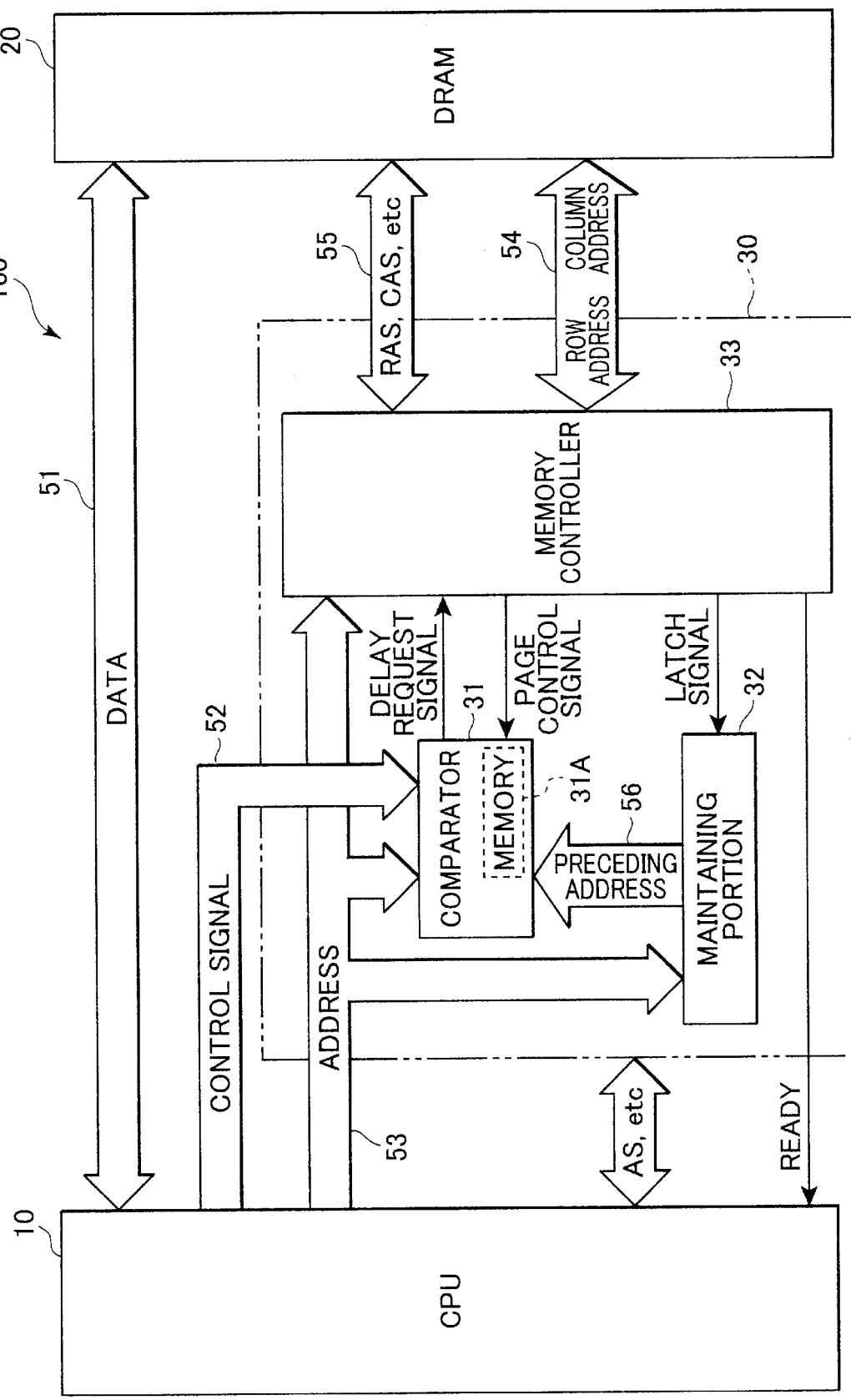
FIG. 1 is a block diagram of a data storage device according to a first embodiment of the present invention.

FIG. 1 is a data storage device of the first embodiment, to which the signal control circuit of the present invention is applied. A memory circuit employed in the data storage device of the first embodiment is constructed from DRAM (dynamic RAM).

As shown in FIG. 1, the data storage device 100 of the present embodiment includes: a CPU 10, a DRAM 20, and an address control circuit 30. The CPU 10 serves as a main processing circuit for outputting address signals. The DRAM 20 serves as a memory circuit for performing data reading/writing operation onto addresses designated by the address signals outputted from the CPU 10. The address control circuit 30 is provided between the CPU 10 and the DRAM 20, and serves as a signal control circuit for performing address control onto the DRAM 20 based on the address signals outputted from the CPU 10.

More specifically, the address control circuit 30 includes a comparing portion 31, a maintaining portion 32, and a memory control circuit 33. The CPU 10 is connected to the DRAM 20 via data bus 51. The CPU 10 communicates data with the DRAM 20 via the data bus 51. That is, the CPU 10 outputs data to and receives data from the DRAM 20 via the data bus 51. The CPU 10 is connected also to the comparing portion 31, the maintaining portion 32, and the memory control circuit 33 via address bus 53. With this arrangement, address signals outputted from the CPU 10 are supplied, via the address bus 53, to the comparing portion 31, the maintaining portion 32, and the memory control circuit 33. It is noted that each set of address signals, outputted from the CPU 10, is a digital signal comprised of twenty bits, for example.

The CPU 10 is further for outputting a reference value setting signal (described later) and a reference bit pattern setting signal (described later) to the comparator 31 in the address control circuit 30. The CPU 10 is further for outputting an address strobe signal AS (described later) to the address control circuit 30.

DRAM 20 employs address multiplexing method. Accordingly, the address signal, originally outputted from the CPU 10, is first divided by the memory controller 33 into row address and column address in a time-division manner before being inputted to the DRAM 20. The DRAM 20 is of a type that designates desired addresses in page mode. In order to successively designate addresses in a single page, that is, to successively designate addresses of different column addresses on the same row address, the memory controller 33 first supplies the DRAM 20 with the row address, and then successively supplies the DRAM 20 with column addresses. DRAM 20 will maintain the first-inputted row address, and then successively designate addresses through combining the maintained single row address with the successively-inputted column addresses.

The address control circuit 30, including the comparator 31, the maintaining portion 32, and the memory control circuit 33, is realized in the form of an Application Specific Integrated Circuit (ASIC) specific to the CPU 10.

The comparator 31 is connected to the CPU 10 via address bus 53, and is for receiving address signals outputted from the CPU 10. The comparator 31 is connected to the maintaining portion 32 via bus 56, and is for receiving address signals maintained in the maintaining portion 32. The comparator 31 is further for receiving page control signals outputted from the memory control portion 33. The comparator 31 is connected also to the CPU 10 via control bus 52, and is for receiving the reference value setting signal and the reference bit pattern setting signal from the CPU 10.

The comparator 31 includes a memory 31A. The memory 31A stores a reference value and a reference bit pattern table P therein as described later.

Figure 2:
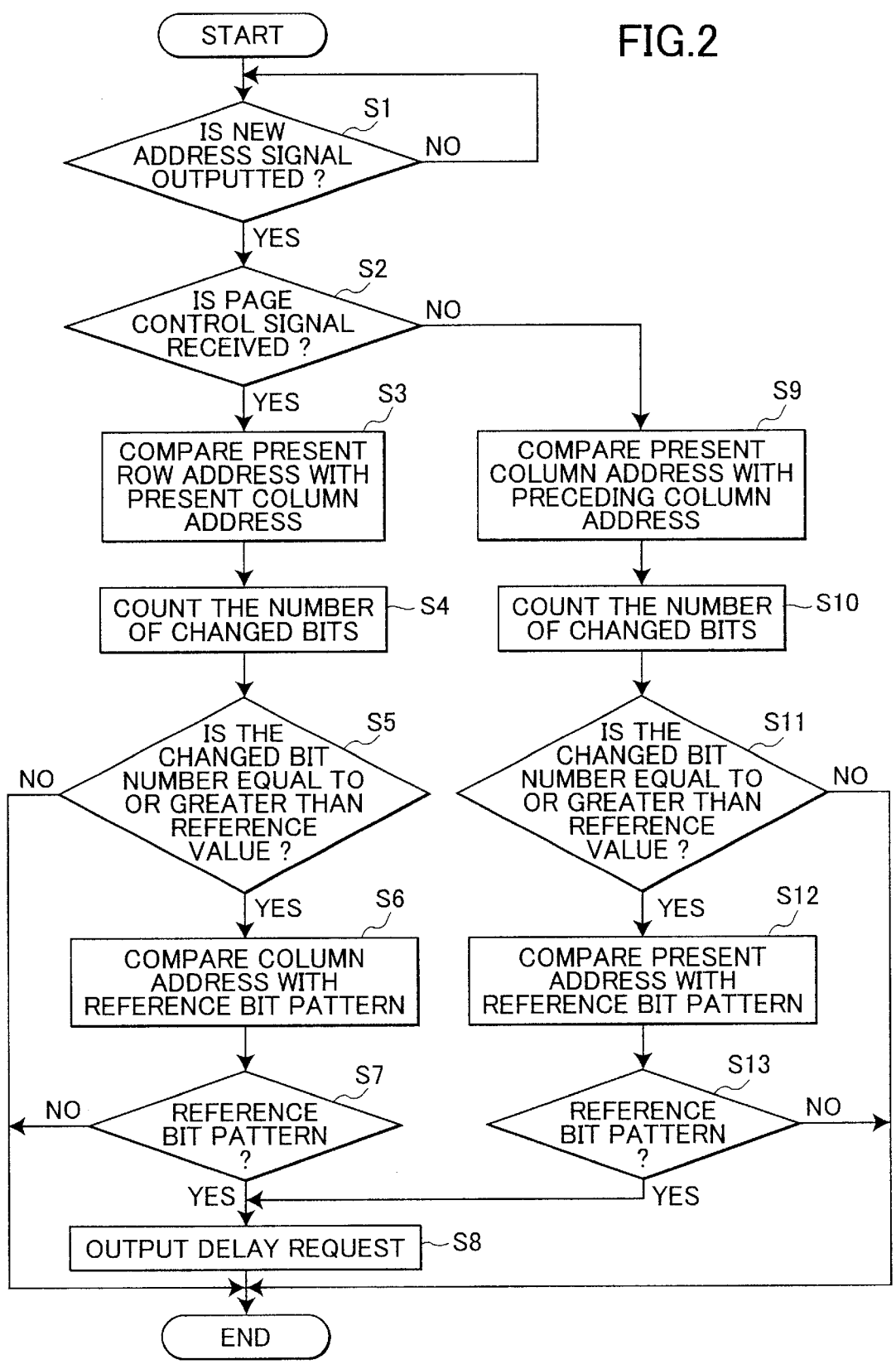
FIG. 2 is a flowchart showing a comparing judging process of the first embodiment.

With the above-described structure, the comparator 31 performs a comparing judging process shown in FIG. 2 based on address signals, page control signals, the reference value, the reference bit pattern table P. Based on the judged result, the comparator 31 outputs a delay request signal to the memory controller 33. The comparing judging process of FIG. 2 will be described later.

The maintaining portion 32 is connected to the CPU 10 via address bus 53, and is for temporarily maintaining an address signal outputted from the CPU 10. The maintaining portion 32 is also for receiving a latch signal outputted from the memory controller 33. The maintaining portion 32 stores, at a timing when the maintaining portion 32 receives the latch signal, an address signal that is being outputted to the address bus 53 from the CPU 10. More specifically, the memory controller 33 outputs a latch signal during a period after the comparator 31 completes the comparing judging process of FIG. 2 and immediately before the CPU 10 sets a new address signal to be outputted. With this arrangement, the maintaining portion 32 can store an address signal that is being outputted to the address bus 53 during the period after the comparator 31 completes the comparing judging process of FIG. 2 and immediately before the CPU 10 sets a new address signal to output. Accordingly, when the CPU 10 outputs a new address signal (present address signal), the maintaining portion 32 is maintaining another address signal (preceding address signal) that the CPU 10 has outputted at a timing (preceding timing) before outputting the present address signal.

The memory controller 33 is for receiving an address signal, outputted from the CPU 10, for dividing the address signal into row address and column address, and for outputting the row address and column address to DRAM 20 in a previously-set order. More specifically, the memory controller 33 divides the entire twenty bits of the received address signal into high-order ten bits and low-order ten bits.

The memory controller 33 outputs the high-order ten bits as row address and the low-order ten bits as column address. Thus, the memory controller 33 can designate addresses in DRAM 20 according to the multiplexing method.

The row address and column address, outputted from the memory controller 33, are supplied via address bus 54 to DRAM 20. Because each of the row address and column address is comprised from ten bits in this example, the address bus 54 is constructed from ten signal lines.

The memory controller 33 is also for outputting control signals, such as row address strobe signal RAS, column address strobe signal CAS. The row address strobe signal RAS and the column address strobe signal CAS are for indicating, to the DRAM 20, read timings of the row address and the column address, respectively. Those control signals are supplied to the DRAM 20 via bus 55.

The memory controller 33 is further for constantly monitoring address signals outputted from the CPU 10. When row address included in the present address signal, that is outputted from the CPU 10 at the present timing, changes from row address included in the preceding address signal, that has been outputted from the CPU 10 at a preceding timing, the memory controller 33 divides the present address signal into row address and column address, and then successively outputs both the row address and column address to the DRAM 20 in this order.

On the other hand, when row address included in the present address signal is the same as the row address included in the preceding address signal, the memory controller 33 divides the present address signal into row address and column address, and then outputs only the column address to the DRAM 20. Thus, the memory controller 33 can perform address designation operation in the page mode.

It is noted that when the row address, included in the present address signal, changes from the row address included in the preceding address signal, the memory controller 33 outputs a page control signal to the comparator 31.

The memory controller 33 also serves to output a latch signal to the maintaining portion 32 at timings described already.

With the above-described structure, the data storage device 100 operates as described below.

When the CPU 10 outputs an address signal indicating a desired address in the DRAM 20, the address signal is inputted to the comparator 32, the maintaining portion 32, and the memory controller 33. The memory controller 33 divides the received address signal into row address and column address. The memory controller 33 then supplies the thus divided row address and column address to the DRAM 20 in a manner of the page mode as described above. At that time, the memory controller 33 further supplies the DRAM 20 with control signals such as the row address strobe signal RAS and the column address strobe signal CAS, thereby indicating, to the DRAM 20, timings to read the row address and the column address. DRAM 20 reads the row address and the column address at the timings indicated by the row address strobe signal RAS and the column address strobe signal CAS, thereby designating the desired address. After the desired address is thus designated in the DRAM 20, data writing/reading operation is performed via data bus 51 between the CPU 10 and the DRAM 20.

The address signal, inputted to the comparator 31 from the CPU 10, is subjected to the comparing judging process of FIG. 2 by the comparator 31. Based on the comparing judging result, the comparator 31 selectively outputs a delay request signal to the memory controller 33. When receiving the delay request signal, the memory controller 33 delays the timing when the memory controller 33 will change the column address strobe signal CAS to a low level (active state). In other words, when receiving the delay request signal, the memory controller 33 delays the timing of a lowering edge of the column address strobe signal CAS.

The address signal, inputted to the maintaining portion 32 from the CPU 10, is stored in the maintaining portion 32 after the comparator 31 completes the comparing judging process and at the timing when the latch signal is supplied to the maintaining portion 32 from the memory controller 33.

The comparing judging process executed by the comparator 31 will be described below with reference to FIG. 2.

In S1, the comparator 31 judges whether or not a new address signal is outputted from the CPU 10. In order to perform this judgment operation, the comparator 31 refers to an address strobe signal AS that is outputted from the CPU 10 to the address control circuit 30 as indicative of the timing when the CPU 10 outputs an address signal.

When the judged result shows that a new address signal (present address signal) is outputted ("yes" in S1), the program proceeds to S2. When the judged result shows that any new address signal is not yet outputted ("no" in S1), the program repeatedly executes the process of S1 until a new address signal is outputted, thereby waiting output of a new address signal.

In S2, the comparator 31 judges whether or not the comparator 31 receives a page control signal from the memory controller 33. As described above, the memory controller 33 outputs a page control signal to the comparator 31 when row address included in the present address signal, that is newly outputted from the CPU 1, is different from row address included in the preceding address signal that has been outputted from the CPU 1 at a preceding timing. When the comparator 31 receives the page control signal ("yes" in S2), the comparator 31 knows that row address indicated by the present address signal is different from that indicated by the preceding address signal. When the comparator 31 does not receive the page control signal ("no" in S2), on the other hand, the comparator 31 knows that row address indicated by the present address signal is the same as that indicated by the preceding address signal. When the judging result in S2 shows that the comparator 31 receives the page control signal ("yes" in, S2), the program proceeds to S3.

In S3, the comparator 31 compares the row address, that is included in the present address signal, with column address that is also included in the present address signal. More specifically, the comparator 31 first divides the entire twenty bits, in the received present address signal, into high-order ten bits and low-order ten bits. The comparator 31 then compares each bit in the high-order ten bits with a corresponding bit in the low-order ten bits. Then, in S4, the comparator 31 counts the number of bits, at which the low-order ten bits are different from the higher-order ten bits.

It is now assumed that the comparator 31 receives the present address signal, of "00000000001111111111b, " for example. In this case, the comparator 31 divides the entire twenty bits "00000000001111111111b" into the high-order ten bits of "0000000000b" and the low-order ten bits of "1111111111b". Then, the comparator 31 compares each bit in the high-order ten bits "0000000000b" with a corresponding bit in the low-order ten bits "1111111111b." All the bits in the high-order ten bits "0000000000b" are different from corresponding bits in the lower-order ten bits "1111111111b." Accordingly, the number of bits, at which the high-order ten bits "0000000000b" are different from the low-order ten bits "1111111111b", is calculated as ten (10).

It is also assumed that the comparator 31 receives the present address signal of "00000000010000000011b, " for another example. In this case, the comparator 31 divides the entire twenty bits of "00000000010000000011b" into high-order ten bits of "0000000001b" and low-order ten bits of "0000000011b". The comparator 31 compares each bit in the high-order ten bits "0000000001b" with a corresponding bit in the low-order ten bits "000000001b." In this case, the high-order ten bits are different from the low-order ten bits only in the second bit. Accordingly, the number of bits, at which the high-order ten bits "0000000001b" are different from the low-order ten bits "0000000011b", is calculated as one (1).

In order to attain the above-described calculation, the comparator 31 executes in S3 and S4 to perform an "exclusive or" operation on a bit-by-bit basis for the high-order ten bits and the low-order ten bits, thereby obtaining a resultant value.

The comparator 31 further counts the total number of bits, in the resultant value, whose bit states are one (1). Thus, the comparator 31 can easily calculate the number of bits, at which the low-order ten bits are different from the high-order ten bits.

Next, the program proceeds to S5. In S5, the comparator 31 judges whether or not the number of the bits, at which the low-order ten bits are different from the high-order ten bits, is greater than or equal to the reference value that is stored in the memory 31A. It is noted that noise will possibly occur in the address bus when many address bits, outputted from the memory controller 33 to the DRAM 20, change simultaneously. More specifically, noise will possibly occur when many bits (bits of 50 to 100% of the entire address bits) change simultaneously. Noise will highly possibly occur when almost all the address bits (bits of 90 to 100% of the entire address bits) change simultaneously. In the present embodiment, ten bits are simultaneously outputted from the memory controller 33 to the DRAM 20 as each of row address and column address. Noise highly possibly occurs in the address bus 54 when nine or ten address bits change simultaneously. In this respect, the reference value is set equal to nine (9) during the present comparing judging process. It is noted, however, that the reference value can be set to other various values, such as values in the range of five (5) through eight (8) or ten (10). Data of the reference value is stored in the memory 31A in the comparator 31, and is changeable according to a reference value setting signal outputted from the CPU 1 as described later.

Thus, in the case where the address signal outputted from the CPU 1 is "00000000001111111111b," the comparator 31 determines that ten bits be changed in total from the high-order bits to the low-order bits. The judgment in S5 therefore results affirmative ("yes" in S5), and the program proceeds to S6.

In S6, the comparator 31 compares the low-order ten bits of the present address signal with each of the plurality of reference bit patterns that are stored in the reference bit pattern table P in the memory 31A. Than, in S7, the comparator 31 judges whether or not some of the reference bit patterns in the reference bit pattern table P is in consistent with the low-order ten bits of the present address signal.

Figure 3:
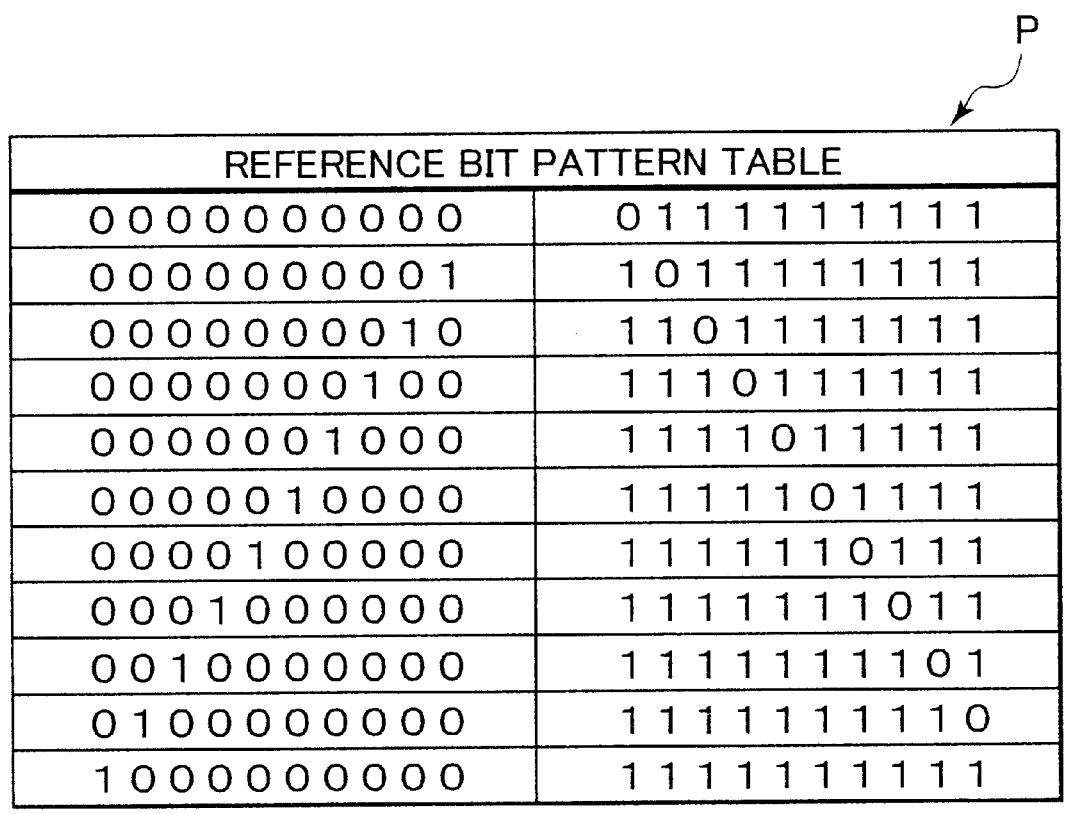
FIG. 3 illustrates a reference bit pattern table according to the first embodiment.

It is noted that noise will possibly occur in the address bus when many address bits (bits of 50 to 100% of the entire address bits), that are outputted from the memory controller 33 to the DRAM 20, change simultaneously from the same state of "0" (or "1") to the other state "1" (or "0"). Especially, noise will highly possibly occur in the address bus when almost all the address bits (bits of 90 to 100% of all the address bits) change simultaneously from the same state of "0" (or "1") to the other same state of "1" (or "0"). For example, noise will highly possibly occur when the address changes from "0000000000b" to "1111111111b". In this respect, a plurality of predetermined bit patterns, as shown in FIG. 3, are stored in the reference bit pattern table P as the reference bit patterns. The reference bit pattern table P is recorded in the memory 31A of the comparator 31. As described later, the reference bit pattern table P is changeable according to a reference bit pattern setting signal outputted from the CPU 1. The reference bit patterns can therefore be easily changed through changing the reference bit pattern table P.

When the low-order ten bits in the address signal is judged to coincide with some reference bit pattern in the reference bit pattern table P, the judgment in S7 becomes affirmative ("yes" in S7), and the program proceeds to S8. In S8, the comparator 31 outputs a delay request signal to the memory controller 33.

The delay request signal is for requesting the memory controller 33 to delay the timing of the falling edge of the column address strobe signal CAS, thereby to delay the timing when the DRAM 20 will read the present column address. As described later, when the delay request signal is inputted to the memory controller 33, the memory controller 33 temporarily delays the timing, at which the memory controller 33 will change the column address strobe signal CAS, that is outputted from the memory controller 33 to the DRAM 20, from a high state (inactive state) to a low state (active state). Because DRAM 20 reads a column address at the timing of a falling edge of the column address strobe signal CAS, when the falling edge of the column address strobe signal CAS is delayed, the timing when the DRAM 20 will read column address is also delayed.

On the other hand, when the total number of bits, at which the low-order ten bits are different from the high-order ten bits, is lower than the reference value, the judgment in S5 becomes negative ("no" in S5), and therefore the delay request signal is not outputted. For example, when the address signal, outputted from the CPU 1, is "00000000010000000011b," the low-order ten bits are different from the high-order ten bits only at a single bit. Accordingly, the judgment results in S5 as negative ("no" in S5), and therefore any delay request signal is not outputted.

Also when the low-order ten bits in the present address signal are not consistent with any reference bit patterns in the reference bit pattern table P ("o" in S7), any delay request signal is not outputted, either.

When the judgment result in S2 shows that the comparator 31 does not receive any page control signal ("no" in S2), the program proceeds to S9.

In S9, the comparator 31 compares a column address (present column address), that is included in the present address signal newly outputted front the CPU 10, with another column address (preceding column address) included in the preceding address signal that has been outputted from the CPU 10 at a preceding timing and that is being maintained in the maintaining portion 32. Then, In S 10, the comparator 31 counts the number of bits, at which the present column address is different from the preceding column address.

It is now assumed that the comparator 31 receives the present address signal of "01100000000000000000b," and that the comparator 31 has received the preceding address signal of "1100000001111111111b," for example. In this case, the comparator 31 compares each bit in the present column address "0000000000b," that is included in the present address signal, with a corresponding bit in the preceding column address "1111111111b," that is included in the preceding address signal. All the bits in the present column address "0000000000b" are different from corresponding bits in the preceding column address "1111111111b." Accordingly, the number of bits, at which the present column address "0000000000b" are different from the preceding column address "1111111111b", is calculated as ten (10).

It is also assumed that the comparator 31 receives the present address signal of "0110000000000010111b" and that the comparator 31 has received the preceding address signal of "0110000000000011110b," for example. The comparator 31 compares each bit in the present column address "0000010111b" with a corresponding bit in the preceding column address "0000011110b." The present column address is different from the preceding column address only in the first and fourth bits. Accordingly, the number of bits, at which the present column address "0000010111b" is different from the preceding column address "0000011110b", is calculated as two (2).

In order to attain the above-described calculation, the comparator 31 executes in S9 and S 10 to perform an "exclusive or" operation on a bit-by-bit basis for the present column address and the preceding column address, thereby obtaining a resultant value. The comparator 31 then counts the total number of bits, in the resultant value, whose bit states are one (1). Thus, the comparator 31 can easily calculate the number of bits where the present column address is different from the preceding column address.

Then, the program proceeds to S11. In S11, the comparator 31 judges whether or not the number of the bits, at which the present column address is different from the preceding column address, is greater than or equal to the reference value stored in the memory 31A. In this example, the reference value is set equal to nine (9) as described above. Accordingly, when the present address signal is "00000000010000000000b" and the preceding address signal is "00000000011111111111b," for example, the number of bits, at which the present column address changes from the preceding column, is calculated as ten (10). The judgment in S11 therefore results affirmative ("yes" in S11), and the program proceeds to S12.

In S12, the comparator 31 compares the present column address, included in the present address signal, with each of the plurality of reference bit patterns stored in the reference bit pattern table P (FIG. 3). In S13, the comparator 31 judges whether or not some of the reference bit patterns in the reference bit pattern table P is in consistent with the present column address.

When the present column address is judged to coincide with some reference bit pattern in the reference bit pattern table P, the judgment in S13 becomes affirmative ("yes" in S13), and the program proceeds to S8. In S8, the comparator 31 outputs a delay request signal to the memory controller 33.

On the other hand, when the total number of bits, at which the present column address is different from the preceding column address, is lower than the reference value, the judgment in S11 becomes negative ("no" in S11), and therefore the delay request signal is not outputted. For example, when the present address signal is "00000000000000010111b" and the preceding address signal is "00000000000000011110b", the present column address differs from the preceding column address only apt two bits. Accordingly, the judgment results in S11 as negative ("no" in S11), and therefore any delay request signal is not outputted.

Also when the present column address is not consistent with any reference bit patterns in the reference bit pattern table P ("no" in S13), any delay request signal is not outputted, either.

When a delay request signal is outputted from the comparator 31 to the memory controller 33, the memory controller 33 operates as described below.

Figure 4:
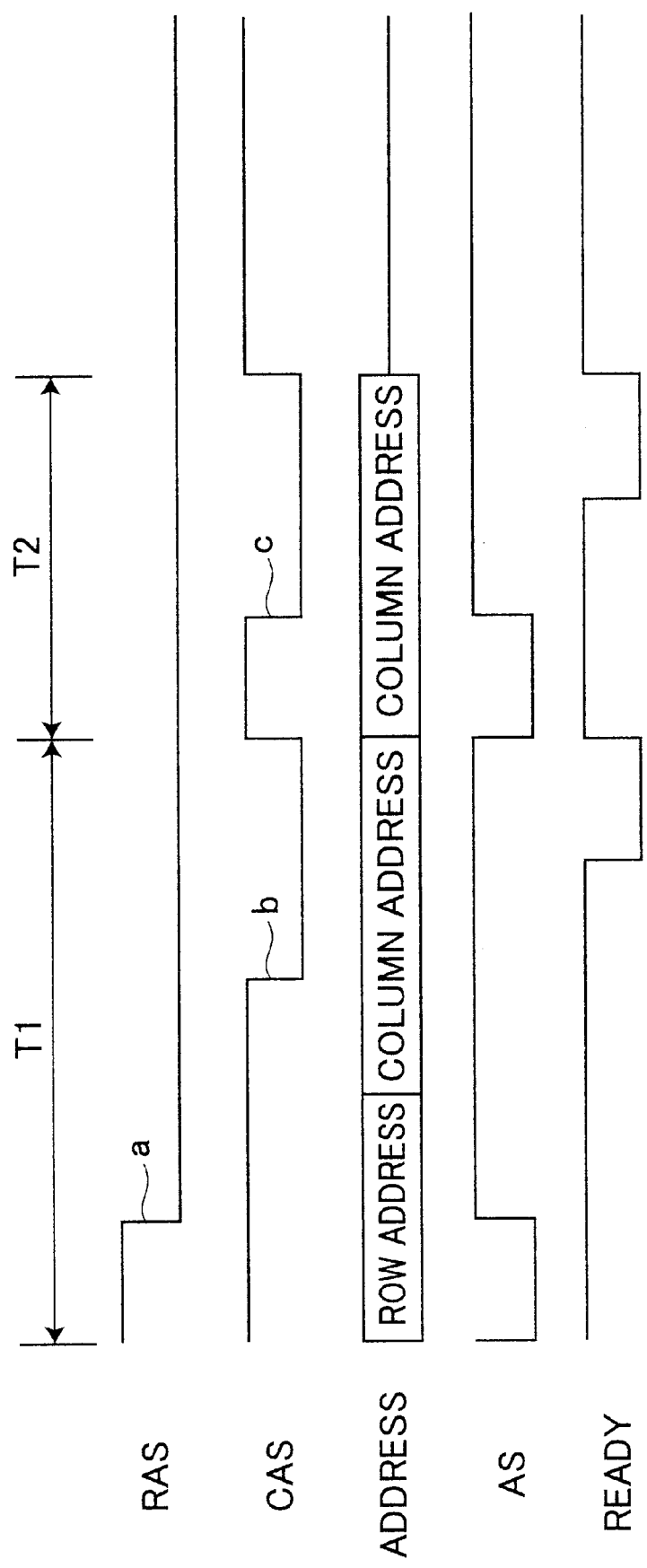
FIG. 4 is a timing chart showing timings of row address strobe signal ras, column address strobe signal CAS, address according to the first embodiment.
Figure 5:
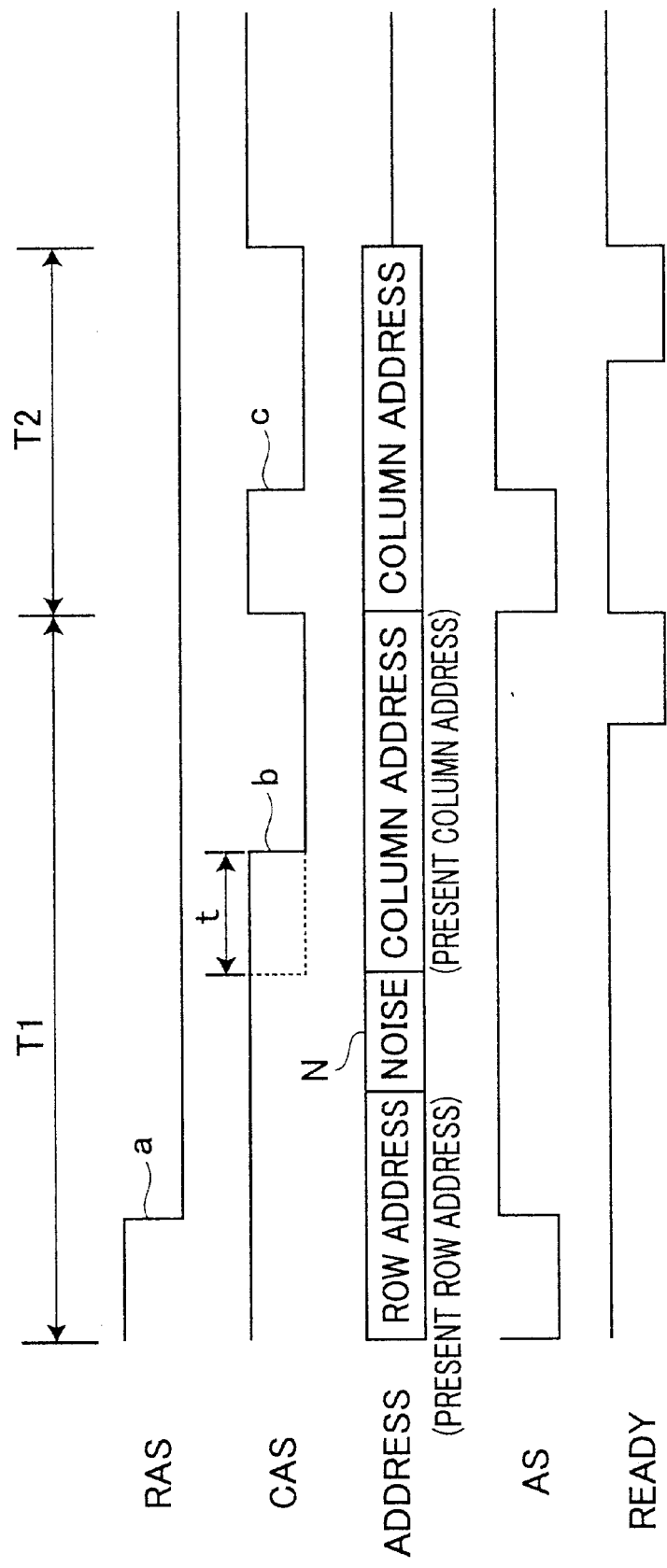
FIG. 5 is a timing chart showing one example how the column address strobe signal falling timing is delayed according to the first embodiment.
Figure 6:
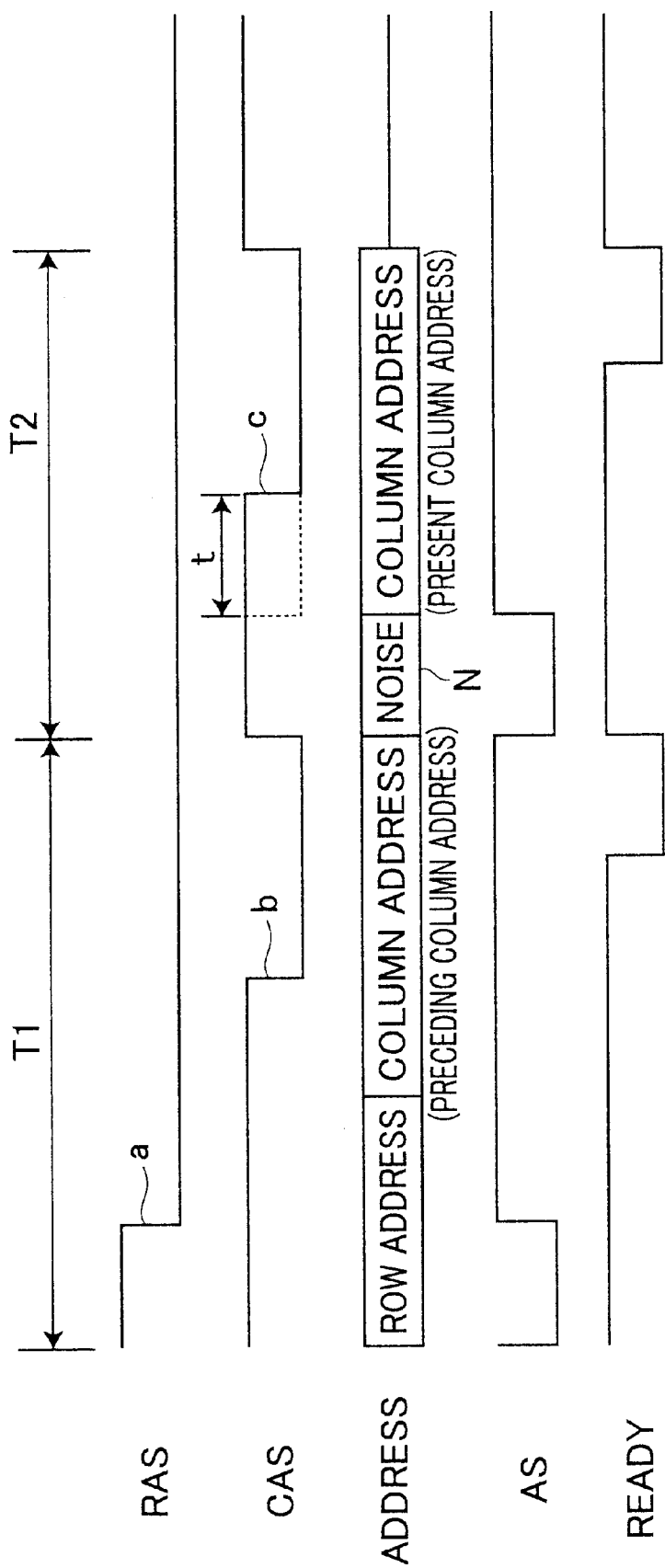
FIG. 6 is a timing chart showing another example how the column address strobe signal falling timing is delayed according to the first embodiment.

FIGS. 4–6 show timing charts indicative of output timings of: row address strobe signal RAS, column address strobe signal CAS, row address, column address, address strobe signal AS, and ready signal READY.

The row address strobe signal RAS is outputted from the memory controller 33 to the DRAM 20. The falling edge "a" of the signal RAS indicates the timing when the DRAM 20 should read row address. The column address strobe signal CAS is outputted also from the memory controller 33 to the DRAM 20. Each of the falling edges "b" and "c" of the signal CAS indicates the timing when the DRAM 20 should read column address.

The address strobe signal AS is outputted from the CPU 10 to the address controller 30, and indicates the timing when the CPU 10 outputs the address signal. Based on the address strobe signal AS, the signal control circuit 30 determines an output time period T, during which the memory controller 33 should output address to the DRAM 20. The ready signal READY is outputted from the memory controller 33 to the CPU 10 and is for indicating an end timing of each output period T.

In this example, as shown in FIGS. 4–6, the memory controller 33 successively outputs row address and column address and further outputs column address. The memory controller 33 outputs the-pair of row address and column address during a first output period T1. The memory controller 33 outputs the next column address during a second output period T2.

In a normal time when the comparator 31 outputs no delay request signal, each of the falling edges "b" and "c" of the column address strobe signal CAS occurs at an appropriate timing for the DRAM 20 to read corresponding column address. The timings of the falling edges "b" and "c" are previously set according to 10 the design, specifications of the DRAM 20.

On the other hand, if the comparator 31 outputs a delay request signal during the first output period T1, the timing of the falling edge "b" of the column address strobe signal CAS is delayed by a predetermined delay period "t" as shown in FIG. 5. In FIG. 5, a dotted line indicates the falling edge that occurs during the normal time shown in FIG. 4, and a solid line indicates the falling edge that is delayed by the delay time "t" in response to the delay request signal.

It is assumed that the present address signal newly outputted from the CPU 10 is "00000000001111111111b" and that row address included in the present address signal is different from a preceding row address. In this case, the memory controller 33 successively supplies the DRAM 20 with both row address "0000000000b" and column address "1111111111b" in this order. As a result, all the bits in the address, outputted from the memory controller 33 to the DRAM 20, simultaneously change from the same state of "0" to the other state of "1". As a result, as shown in FIG.

5, noise N will possibly occur when the address output is switched from the row address to the column address.

In such a case, the comparator 31 of the present embodiment performs the comparing judging process of FIG. 2 to compare the present row address and the present column address with each other. The comparator 31 outputs a delay request signal to the memory controller 33 when the number of bits, at which the column address is different from the row address, is greater than or equal to the reference value and when the column address coincides with either one of the predetermined reference bit patterns. When receiving the delay request signal, the memory controller 33 delays the column address strobe falling edge timing "b" by the delay time "t" as shown in FIG. 5. Thus, it is possible to delay the timing when the DRAM 20 will read the present column address. It is possible to shift the timing, when the DRAM 20 will read the present column address, from the timing when the noise N occurs. When the DRAM 20 reads the column address, the noise N has already vanished. Thus, the DRAM 20 can read the present column address without being influenced from the noise N.

When the comparator 31 outputs a delay request signal during the second output period T2, on the other hand, the memory controller 33 delays the timing of the falling edge "c" of the column address strobe signal CAS by the predetermined delay period "t" as shown in FIG. 6. In FIG. 6, a dotted line indicates the falling edge that occurs during the normal time as shown in FIG. 4, and a solid line indicates the falling edge that is delayed by the delay time "t" in response to the delay request signal.

It is assumed that the present address signal, that is newly outputted from the CPU 10 at a present timing, is "01100000000000000000b" and that the preceding address signal, that has been outputted from the CPU 10 at a preceding timing, is "01100000001111111111b." In this case, the row address included in the present address signal is the same as that in the preceding address signal. Accordingly, the memory controller 33 does not output the present row address "0110000000b," but outputs only the present column address "0000000000b." This results in that the memory controller 33 will output the present column address "0000000000b" subsequent to the preceding column address "1111111111b." In this case, all the bits in the address, outputted from the memory controller 33 to the DRAM 20, simultaneously change from the same state of "1" to the other state of "0".

As a result, as shown in FIG. 6, noise N will possibly occur when the address output is switched from the preceding column address to the present column address.

In such a case, the comparator 31 of the present embodiment performs the comparing judging process of FIG. 2 to compare the present column address with the preceding column address. The comparator 31 outputs a delay request signal to the memory controller 33 when the number of bits, at which the present column address is different from the preceding column address, is greater than or equal to the reference value and when the present column address coincides with either one of the predetermined reference bit patterns. When receiving the delay request signal, the memory controller 33 delays the column address strobe signal falling edge timing "c" by the delay time "t" as shown in FIG. 6. It is possible to delay The timing when the CPU 20 will read the present column address. It is possible to shift the timing, when the DRAM 20 will read the present column address, from the timing when the noise N occurs. Accordingly, when the DRAM 20 reads the present column address, the noise N has already vanished. Thus, the DRAM 20 can read column address without being influenced from the noise N.

The reference value and the reference bit patterns used in the above-described comparing judging process can be changed as will be described below.

In the address controlling circuit 30 of the present embodiment, the reference value can be changed into another value in response to an instruction inputted from the CPU 10. That is, the comparator 31 in the address controlling circuit 30 is connected to the CPU 10 via the control bus 52 and is for receiving a reference value setting signal outputted from the CPU 10. The reference value setting signal is for changing the reference value stored in the memory 31 A. In order to change the reference value from "9" to "7", for example, the CPU 10 outputs to the comparator 31 the value "7" as the reference value setting signal. Upon receiving the value "7", the comparator 31 rewrites the reference value, recorded in the memory 31A, with the value "7".

In the address controlling circuit 30 of the present embodiment, each reference bit pattern used in the comparing judging process can be changed also based on another instruction inputted from the CPU 10. That is, the comparator 31 in the address controlling circuit 30 receives a reference bit pattern setting signal from the CPU 10 via the control bus 52. The reference bit pattern setting signal is for changing one reference bit pattern, stored in the reference bit pattern table P, with another reference bit pattern. The reference bit pattern setting signal can therefore rewrite each reference bit pattern, recorded in the reference bit pattern table P, with another bit pattern. More specifically, the reference bit pattern setting signal indicates a new reference bit pattern desired to be set in the reference bit pattern table P. When the reference bit pattern setting signal is inputted from the CPU 10 to the comparator 31, the comparator 31 rewrites one of the reference bit patterns, stored in the table P, with the new reference bit pattern.

Thus, it is possible to change the reference value and the reference bit pattern based on the reference value setting signal and the reference bit pattern setting signal. It is possible to easily change the reference value and the reference bit pattern. With this structure, even after the address control circuit 30 is produced as the ASIC, the reference value and the reference bit pattern can be easily changed based on the instructions issued from the CPU 10. Accordingly, even after the address control circuit 30 is produced as the ASIC, it is possible to modify the address control circuit 30 to fit to the settings and the specifications of the CPU 10 and of the DRAM 20 through merely changing the reference value and the reference bit patterns.

As described above, the address control circuit 30 of the present embodiment delays the falling edge timing of the signal CAS, that is outputted from the memory controller 33 to the DRAM 20, based on the delay request signal outputted from the comparator 31. It is therefore possible to shift the timing when the DRAM 20 will read column address from the timing when noise occurs due to the simultaneous changes of many bits in the address signal inputted to the DRAM 20. It is therefore possible to prevent the DRAM 20 from being designated by inaccurate address due to noise that possibly occur when many bits in the address signal change simultaneously. It is possible to speed-up the designation operation of addresses onto the DRAM 20, and is therefore possible to enhance the accessing speed to the DRAM 20.

When the row address is changed and both the row address and the column address are successively outputted from the memory controller 33 to the DRAM 20, the address control circuit 30 of the present embodiment compares the high-order ten bits (present row address) in the present address signal, that is presently outputted from the CPU 10, with the low-order ten bits (present column address) in the same address signal. When the row address is not changed, and only the present column address is outputted in succession to the preceding column address from the memory controller 33 to the DRAM 20, the address control circuit 30 compares the present column address, that is included in the present address signal presently outputted from the CPU 10, with the preceding column address, that is included in the preceding address signal outputted from the CPU 10 at the preceding timing. Based on the compared results, the comparator 31 determines the timing when the comparator 31 produces the delay request signal. Thus, it is possible to appropriately delay the falling edge of the column address strobe signal CAS, outputted from the memory controller 33 to the DRAM 20, and therefore to appropriately delay the timing when the DRAM 20 will read the present column address.

The number of bits, at which the present column address changes from the present row address, or the number of bits, at which the present column address changes from the preceding column address, is compared with the reference value. The present column address is further compared with each of the predetermined reference bit patterns. It is therefore possible to reliably know whether or not many bits simultaneously change from a preceding single bit state into a present bit state. It is therefore possible to output the delay request signal to the memory controller 33 at appropriate timings. It is ensured that the DRAM 20 will read column address at a delayed timing. It is ensured that the DRAM 20 be prevented from being designated with inaccurate addresses due to noise occurring in the address signal.

As described above, according to the present embodiment, column address reading timing is delayed when many address bits, to be inputted to the DRAM 20, change simultaneously from a single state to the other state. However, there occurs in low frequency that many address bits thus change simultaneously from a certain single state to the other state. Accordingly, even when the column address output timing is thus delayed in those cases, the entire address designating speed will not be lowered.

As described above, according to the present embodiment, the comparator 31 in the address control circuit 30 can compare the present address signal, presently outputted from the CPU 10, with the preceding address signal that is being presently maintained in the maintaining portion 32. When the number of bits, at which the present address signal changes from the preceding address signal, is greater than or equal to the reference value, and when the bit pattern in the present address signal coincides with the reference bit pattern, the falling edge timing of the column address strobe signal CAS, which is outputted from the memory controller 33 to the DRAM 20, is delayed, whereby the address signal reading timing of the DRAM 20 is delayed. Even when all the bits in the address simultaneously change and therefore noise occurs, error will not occur in the input or output of the address signal.

Second Embodiment

A second embodiment of the present invention will be described below with reference to FIG. 7.

According to the present embodiment, the amount (time period) t, by which the CAS signal falling timing is delayed, is changed according to a delay time setting signal outputted from the CPU 10. In the following description, the same or similar elements as those in the first embodiment will be indicated by the same numeral, and description thereof will be omitted.

Figure 7:
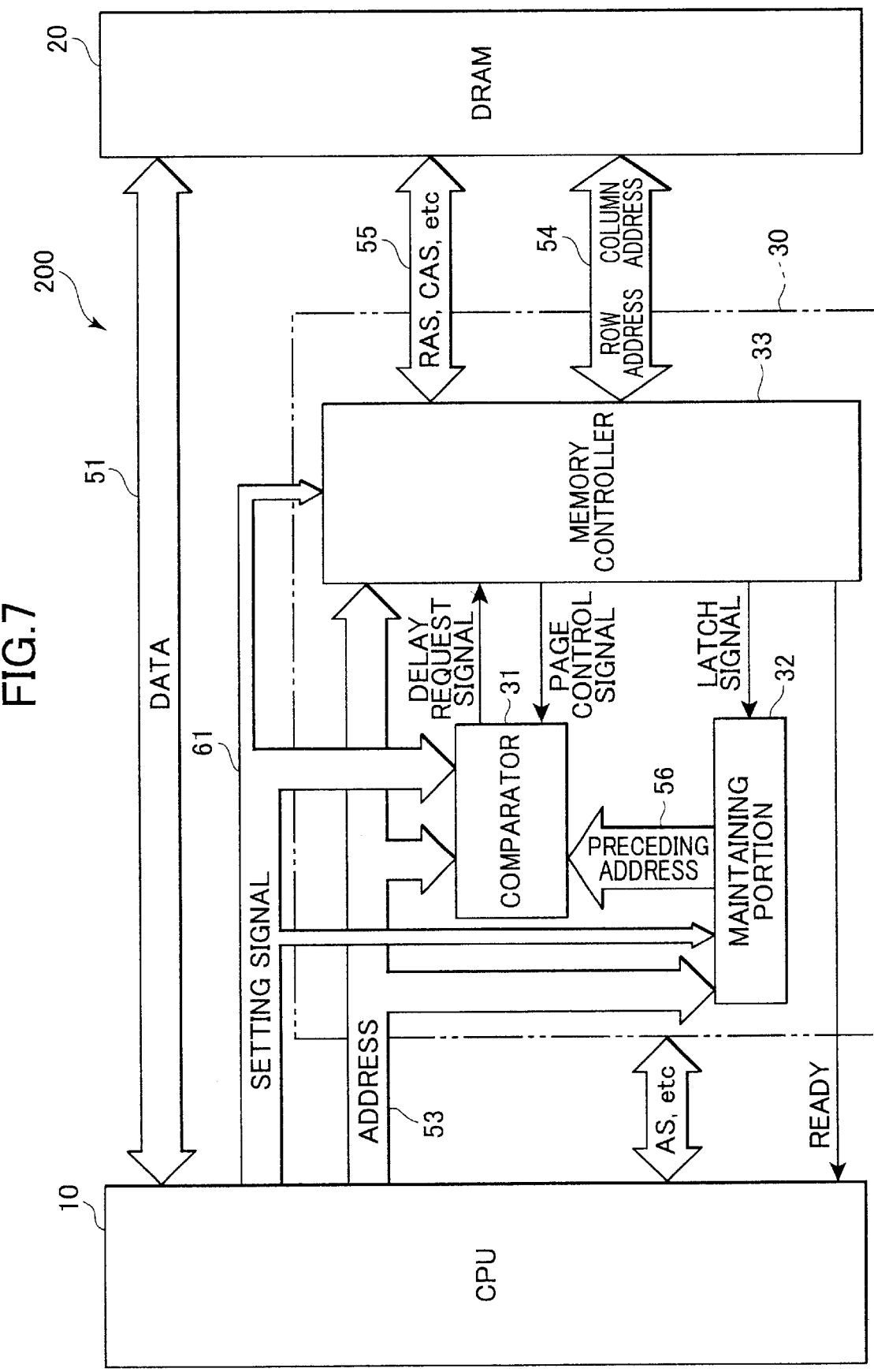
FIG. 7 is a block diagram of a data storage device according to a second embodiment of the present invention.

As shown in FIG. 7, in a data storage device 200 of the present embodiment, the control bus 61 is provided to connect the CPU 10 to: the comparator 31, the maintaining portion 32, and the memory controller 33. The CPU 10 outputs a delay time setting signal to the memory controller 33 via the control bus 61. In the same manner as in the first embodiment, when receiving the delay request signal from the comparator 31, the memory controller 33 delays the falling edge timing of the signal CAS, outputted to the DRAM 20 by the delay time "t". The delay time setting signal is for changing the amount of the delay time "t". That is, the memory controller 33 changes the amount of the delay time "t" based on the delay time signal outputted from the CPU 10. Except for the above-described points, the second embodiment is the same as that of the first embodiment.

More specifically, the memory controller 33 operates based on clock signals inputted from outside (not shown). The memory controller 33 counts the inputted clock signals, thereby determining the timing for the falling edge of the signal CAS. Thus, the memory controller 33 stores the amount of the delay time "t" as the number of clocks. The delay time setting signal, outputted from the CPU 10 to the memory controller 33, indicates the number of clocks corresponding to a delay time "t" desired to be newly-set to the memory controller 33. When receiving the delay time setting signal, the memory controller 33 rewrites the clock number, stored in the memory controller 33, with the newly-inputted clock number. Thus, the memory controller 33 changes the amount of the delay time "t," by which the falling edge timing of the signal CAS is to be delayed.

With the above-described structure, it is possible to change the amount of the delay time "t" for the CAS signal falling edge timing based on the delay time setting signal that is outputted from the CPU 10. Accordingly, even after the address control circuit 30 is produced as the ASIC, for example, the amount of the delay time "t" can be easily changed according to the instruction by the CPU 10. Even when the design and the specification of the data storage device 200 is changed, the address control circuit 30 can be easily fitted to the changed design and specification.

Third Embodiment

A third embodiment of the present invention will be described below with reference to FIGS. 8–10.

In the present embodiment, a static RAM (which will be referred to simply as SRAM hereinafter) is used as the memory circuit. The address controlling circuit controls address signals to be inputted to the SRAM. In the following description, the same or similar elements as those in the first embodiment will be indicated by the same numerals, and description thereof will be omitted.

Figure 8:
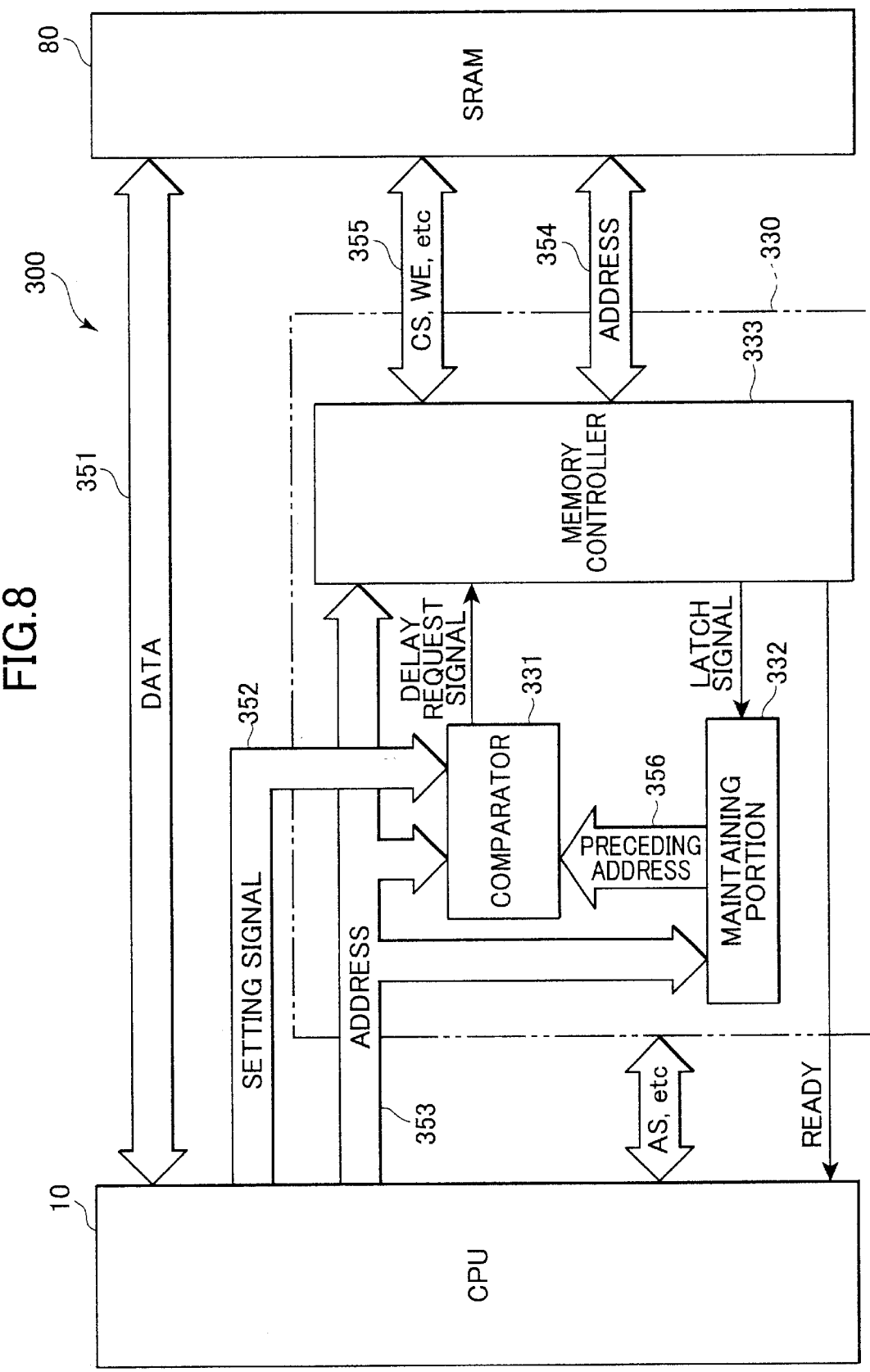
FIG. 8 is a block diagram of a data storage device according to a third embodiment of the present invention.

As shown in FIG. 8, a data storage device 300 of the present embodiment includes: the CPU 10, a SRAM 80, and an address control circuit 330. The CPU 10 serves as the main processing circuit. The SRAM 80 serves as the subsidiary processing circuit. The address control circuit 330 serves as the signal control circuit. The CPU 10 is connected to the SRAM 80 via data bus 351. The CPU 10 communicates data with the SRAM 80 via the data bus 351. That is, the CPU 10 outputs data to and receives data from the SRAM 80 via the data bus 351. The address control circuit 330 includes a comparator 331, a maintaining portion 332, and a memory controller 333. The CPU 10 is connected to the comparing portion 331, the maintaining portion 332, and the memory control circuit 333 via address bus 353. With this arrangement, address signals outputted from the CPU 10 are outputted, via the address bus 353, to the comparing portion 331, the maintaining portion 332, and the memory control circuit 333.

The comparator 331 is for performing the comparing judging process onto the received address signals approximately in the same manner as the comparator 31 of the first embodiment. The maintaining portion 332 is for temporarily storing the received address signals in the same manner as the maintaining portion 32 of the first embodiment.

More specifically, the comparator 331 compares an address signal (present address signal), that is presently outputted from the CPU 10, with another address signal (preceding address signal), that has been outputted from the CPU 10 at a preceding time and that is being maintained in the maintaining portion 332. Next, the comparator 331 calculates the number of bits, at which the present address signal is different from the preceding address signal, and judges whether or not the calculated bit number is greater than or equal to the reference value. When the calculated bit number is greater than or equal to the reference value, the comparator 331 compares the present address signal with each reference bit pattern recorded in the reference bit pattern table P that is stored in the comparator 331. When the present address signal coincides with either one of the reference bit patterns in the table P, the comparator 331 outputs a delay request signal to the memory controller 333. On the other hand, when the number of bits, at which the present address signal is different from the preceding address signal, is smaller than the reference value or when the present address signal does not coincide with any of the reference bit patterns, the comparator 331 does not output any delay request signal.

The memory controller 333 serves to receive the address signal from the CPU 10 and outputs the address signal to the SRAM 80 via an address bus 354. The memory controller 333 also serves to output, via bus 355 to the SDRAM 80, a chip select signal CS, a write enable signal WE, an output enable signal OE. The chip select signal CS is for selecting the SRAM 80 as an object, with which the CPU 10 will communicate data. The write enable signal WE is outputted when data is to be written to the SRAM 80. The write enable signal WE is therefore for allowing the SRAM 80 to be written with or to be stored with data. The output enable signal OE is outputted when data is to be read from the SRAM 80. The output enable signal OE is therefore for allowing the SRAM 80 to output data therefrom for reading.

With the above-described structure, the data storage device 300 of the present embodiment operates as described below with reference to FIGS. 9 and 10.

Figure 9:
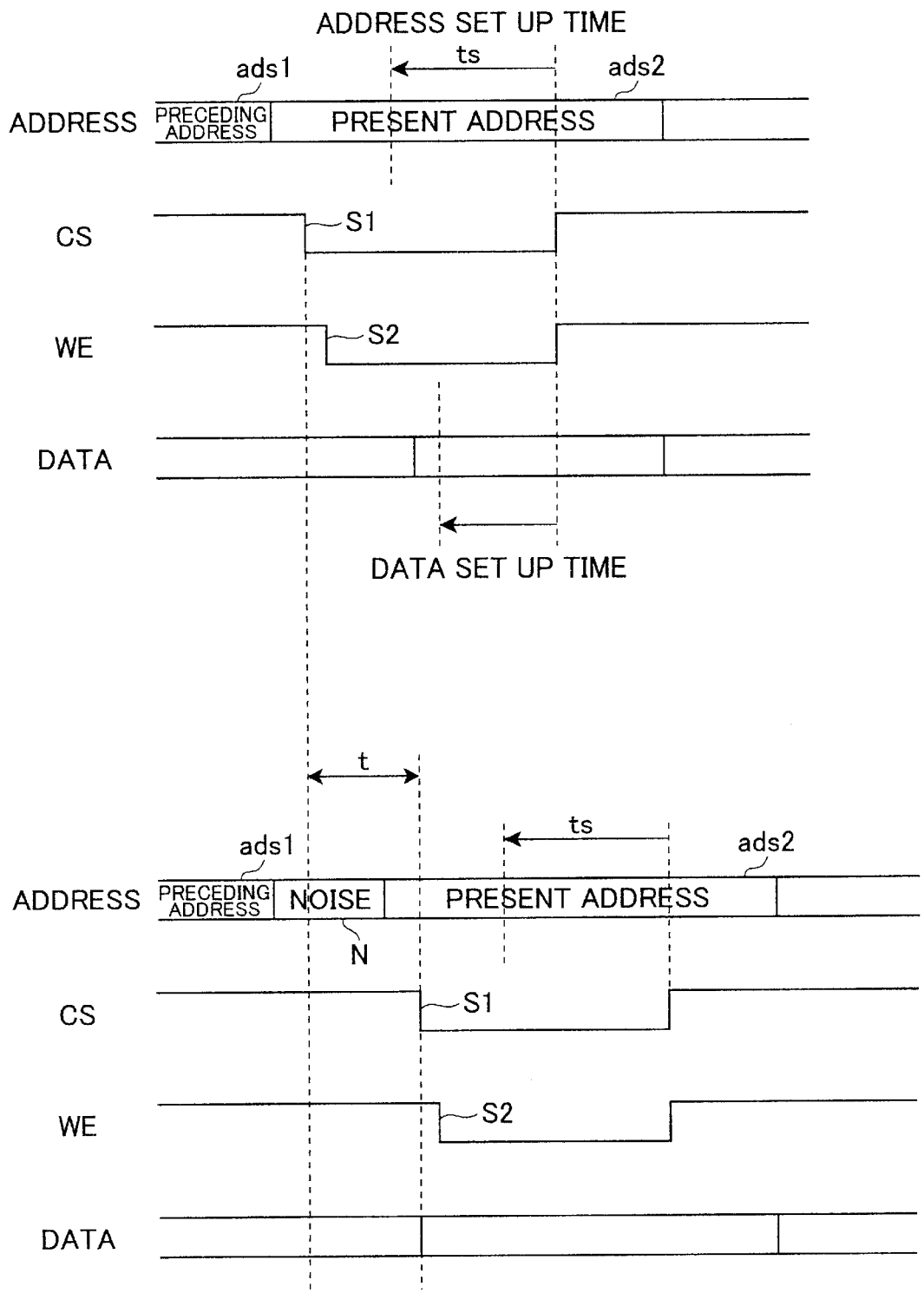
FIG. 9 show a pair of timing charts showing output timings of an address signal, chip select signal CS, write enable signal WE, and data when desiring to write data according to the third embodiment, wherein the upper section of FIG. 9 shows a timing chart when a delay request signal to is not outputted and the lower section of FIG. 9 shows a timing chart when a delay request signal is outputted.

FIG. 9 shows the timing charts how the SRAM 80 is written with data in accordance with an address signal (present address signal "ads2"). In FIG. 9, an upper section indicates a case where the comparator 331 outputs no delay request signal to the memory controller 333, and a lower section indicates the other case where the comparator outputs a delay request signal to the memory controller 333.

More specifically, in the case of the upper section of FIG. 9, the comparator 331 does not output any delay request signal. That is, the upper section of FIG. 9 is the timing chart showing how an address signal (present address signal "ads2"), chip select signal CS, write enable signal WE, and data is outputted during a normal time when the comparator 331 outputs no delay request signal. The lower section in FIG. 9 is the timing chart showing how the address signal (present address signal "ads2"), chip select signal CS, write enable signal WE, and data is outputted when the comparator 331 outputs a delay request signal.

In order to write data into SRAM 80, the period of time, during which the write enable WE is maintained low or active, is set to such a length that a predetermined period of set up time "ts" can be ensured. After the chip select CS falls to the low (active) state, the SRAM 80 sets an address signal (present address signal "ads2"), outputted from the memory controller 333, as valid at a timing when the predetermined period of set up time "ts" will be ensured 25 until the write enable WE rises to the high (inactive) state. Data is written to the SRAM 80 at the rising edge of the write enable WE.

As shown in the upper section of FIG. 9, the falling edge S1 of the chip select CS is normally set as appropriate for the SRAM 80 to read an address signal (present address signal "ads2"). When a delay request signal is supplied from the comparator 331, the falling edge S1 of the chip select CS is delayed by the delay time "t" as shown in the lower section of FIG. 9. The falling edge S2 of the write io enable WE is also delayed by the same delay time "t".

As shown in the lower section of FIG. 9, noise N possibly occurs in the address signal if the address signal changes in many bits from a preceding address signal "ads" to the present address signal "ads2". In this case, the falling edge S1 of the chip select CS can be shifted from the timing when the noise N occurs. Thus, the noise N vanishes before the SRAM 80 reads the present address signal "ads2". The SRAM 80 can therefore read the present address signal "ads2" not influenced from the noise N.

Figure 10:
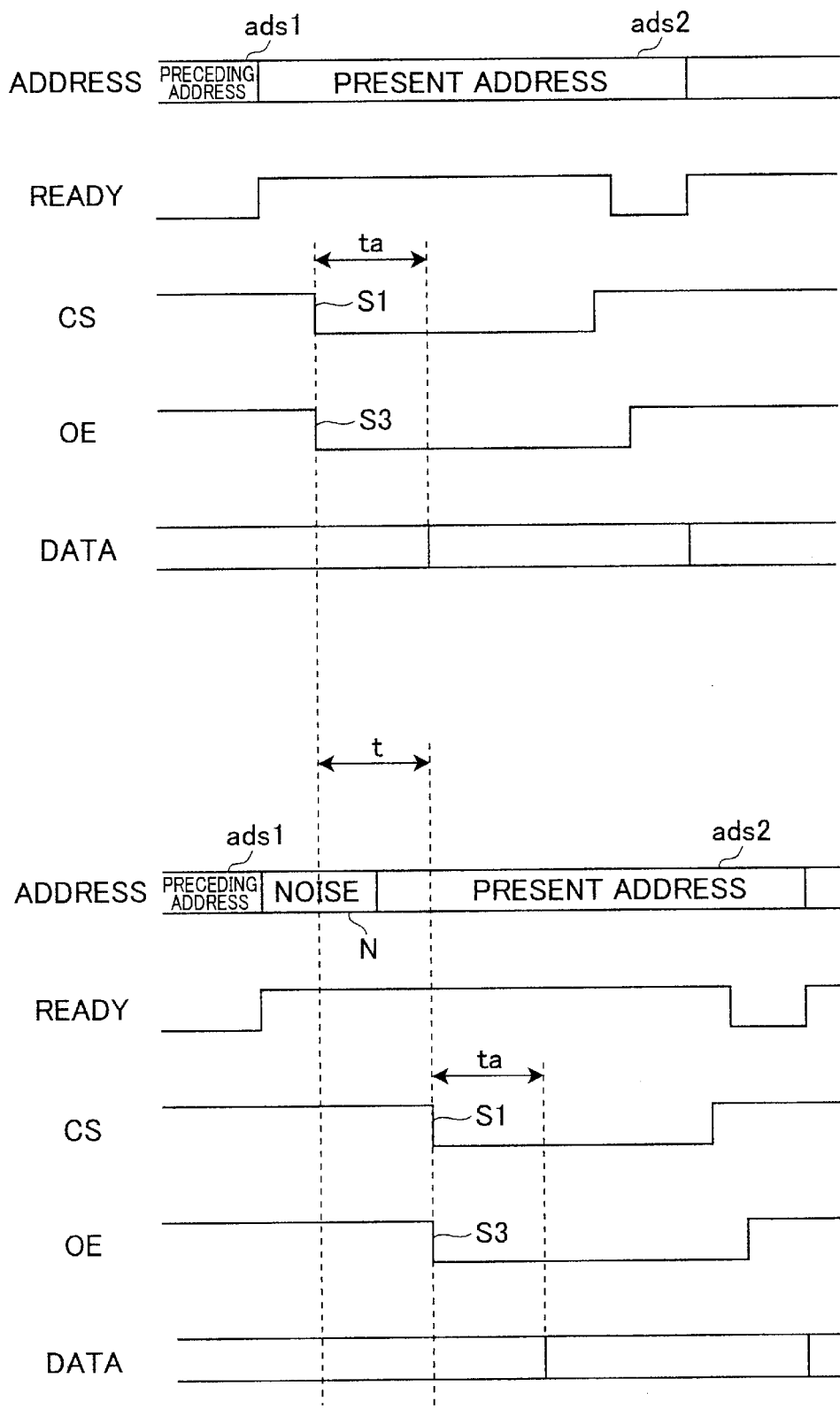
FIG. 10 show a pair of timing charts showing output timings of an address signal, chip select signal CS, output enable signal OE, and data when desiring to read data according to the third embodiment, wherein the upper section of FIG. 10 shows a timing chart when a delay request signal is not outputted and the lower section of FIG. 10 shows a timing chart when a delay request signal is outputted.

FIG. 10 shows the timing charts how data is read from the SRAM 80 in accordance with an address signal (present signal "ads2"). In FIG. 10, an upper section indicates a case where the comparator 331 outputs no delay request signal to the memory controller 333, and a lower section indicates the other case where the comparator 331 outputs a delay request signal to the memory controller 333.

More specifically, in the case of the upper section, the comparator 331 does not output any delay request signal. That is, the upper section of FIG. 10 is the timing chart showing how an address signal (present address signal "ads2"), ready signal READY, chip select signal CS, output enable signal OE, and data is outputted during a normal time when the comparator 331 outputs no delay request signal. The lower section in FIG. 10 is the timing chart showing how the address signal (present address signal "ads2"), ready signal READY, chip select signal CS, output enable signal OE, and data is outputted when the comparator 331 outputs a delay request signal.

The period of time, during which the chip select CS and the output enable OE are maintained low or active, is set to such a length that a predetermined period of access time "ta" can be ensured. After the present address signal "ads2," outputted from the memory controller 333, becomes stable and after the chip select signal CS falls to the low (active) state, the present address signal "ads2" becomes valid for the SRAM 80 and is read by the SRAM BO at a timing when the predetermined access time "ta" will be ensured until data is outputted. Data is outputted from an address in the SRAM 80, designated by the address signal "ads2," to the data bus 351 ashen the predetermined access time "ta" has elapsed after the output enable signal OR falls to the low (active) state.

As shown in the upper section of FIG. 10, normally, the falling edge S1 of the chip select CS and the falling edge S3 of the output enable OE are set as appropriate for the SRAM 80 to read the present address signal "ads2". When a delay request signal is supplied from the comparator 331, the falling edge S1 of the chip select CS is delayed by the delay time "t" as shown in the lower section of FIG. 10. The falling edge S3 of the output enable OE is also delayed by the delay time "t". The ready signal READY is also delayed by the delay time "t".

As shown in the lower section of FIG. 10, noise N possibly occurs in the address signal if the address signal changes in many bits from the preceding address signal "ads " to the present address signal "ads2." In this case, the falling edge S1 of the chip select CS and the falling edge S3 of the output enable OE can be shifted from the timing when the noise N occurs. Thus, the noise N vanishes before the SRAM 80 reads the present address signal. The SRAM 80 can therefore read the present address signal as not influenced from the noise N.

As shown in FIG. 8, the comparator 331 in the address control circuit 330 of the present embodiment is connected to the CPU 10 via a control bus 352. With this structure, the comparator 331 can receive the reference value setting signal and the reference bit pattern setting signal from the CPU 10 in the same manner as in the first embodiment. Additionally, the comparator 331 of the present embodiment can receive a comparative bit setting signal that is outputted also from the CPU 10.

The comparative bit setting signal is for changing bits in the address signal as a subject to be compared by the comparator 331. When designating an address in the SRAM 80 using all the bits in the address signal received from the CPU 10, the memory controller 333 outputs, to the SRAM 80, all the bits in the received address signal as indicative of a desired address. In this case, the comparator 331 also uses all the bits in the received address signal as subjected to its comparing operation. That is, the comparator 331 compares all the bits in the present address signal, that is presently outputted from the CPU 10, with all the bits in the preceding address signal, that has been outputted from the CPU 10 at a preceding timing. Thus, when designating an address using all the bits in the address signal, the comparator 331 sets all the bits in the address signal as the subject to be compared.

On the other hand, when designating an address using only a part of the bits in the address signal received from the CPU 10, the memory controller 333 outputs, to the SRAM 80, only the part of the bits in the received address signal as indicative of a desired address. Accordingly, the comparator 331 sets, as the subject to be compared, the partial bits in the address signal that are required to designate an address. That is, the comparator 331 compares the partial bits in the present address signal with the partial bits in the preceding address signal.

With the above-described structure, even after the address controller 330 is designed and produced, when the bits used for designating addresses of the SRAM 80 are changed, the CPU 10 may output the comparative bit setting signal to the CPU 1, thereby resetting the bits to be compared by the comparator 331. Thus, the address control circuit 330 can be easily fitted to actual use.

Fourth Embodiment

Next, a fourth embodiment of the present invention will be described with reference to FIGS. 11–13.

According to the present embodiment, the signal controlling circuit of the present invention is applied to control of data to be inputted to and to be outputted from the SRAM. In the following description, the same or similar elements as those in the first and third embodiments will be indicated by the same numerals, and description thereof will be omitted.

Figure 11:
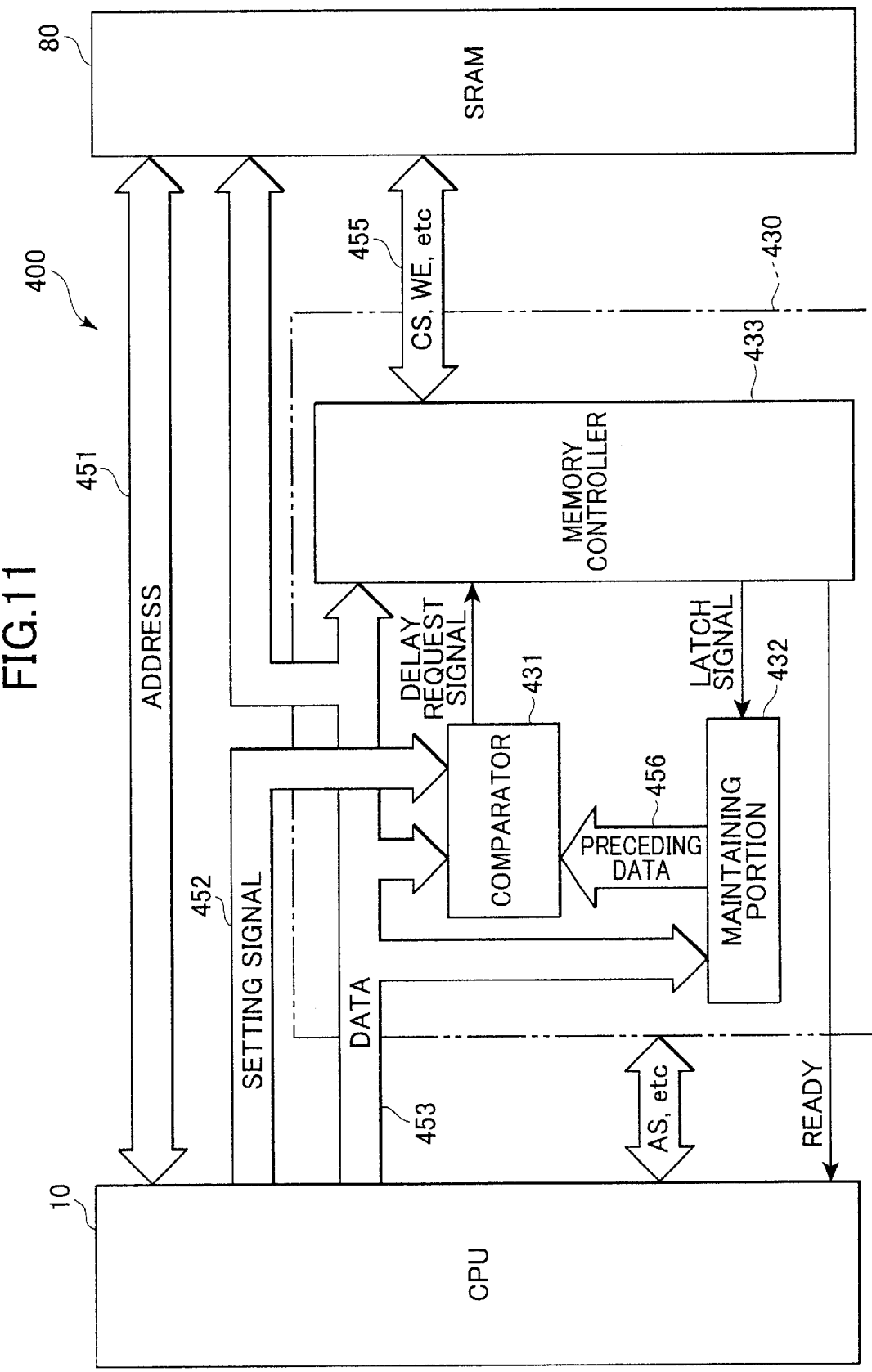
FIG. 11 is a block diagram of a data storage device according to a fourth embodiment of the present invention.

As shown in FIG. 11, a data storage device 400 of the present embodiment includes: the CPU 10, the SRAM 80, and a data control circuit 430. The CPU 10 serves as the main processing circuit, and the SRAM 80 serves as the subsidiary processing circuit. The data control circuit 430 serves as the signal control circuit. The CPU 10 is connected to the SRAM 80 via address bus 451. The CPU 10 outputs address signals to the SRAM 80 via the address bus 451. The data control circuit 430 includes a comparator 431, a maintaining portion 432, and a memory controller 433. The CPU 10 is connected to the comparing portion 431, the maintaining portion 432, the memory control circuit 433, and the SRAM 80 via data bus 453.

The comparator 431 is for performing a comparing judging process, similar to that of the first embodiment, onto data received via data bus 453. The comparator 431 stores therein the reference value and the reference bit pattern table P similarly to the first embodiment. The maintaining portion 432 is for temporarily storing data outputted from the CPU 10 or the SRAM 80 via data bus 453.

More specifically, the comparator 431 compares data (present data), that is presently outputted from the CPU 10, with other data (preceding data), that has been outputted from the CPU 10 at a preceding timing and that is being maintained in the maintaining portion 432. Next, the comparator 431 calculates the number of bits, at which the present data changes from the preceding data, and judges whether or not the calculated bit number is greater than or equal to the reference value stored in the comparator 431. When the calculated bit number is greater than or equal to the reference value, the comparator 431 further compares the present data with each reference bit pattern recorded in the reference bit pattern table P stored in the comparator 431. When the present data coincides with either one of the reference bit patterns in the table P, the comparator 431 outputs a delay request signal to the memory controller 433. On the other hand, when the number of bits, at which the present data changes from the preceding data, is smaller than the reference value or when the present data does not coincide with any of the reference bit patterns, the comparator 431 does not output any delay request signal.

The comparator 431 also performs the same operation as described above onto data to be read from the SRAM 80 to the CPU 10. That is, the comparator 431 compares data (present data), that is presently outputted from the SRAM 80, with other data (preceding data); that has been outputted from the SRAM 80 at a preceding timing and that is being maintained in the maintaining portion 432. Next, the comparator 431 calculates the number of bits, at which the present data changes from the preceding data, and judges whether or not the calculated bit number is greater than or equal to the reference value stored in the comparator 431. When the calculated bit number is greater than or equal to the reference value, the comparator 431 further compares the present data with each reference bit pattern recorded in the reference bit pattern table P stored in the comparator 431. When the present data coincides with either one of the reference bit patterns in the table P, the comparator 431 outputs a delay request signal to the memory controller 433. On the other hand, when the number of bits, at which the present data changes from the preceding data, is smaller than the reference value or when the present data does not coincide with any of the reference bit patterns, the comparator 431 does not output any delay request signal.

The memory controller 433 serves to output, to the SDRAM 80, a chip select signal CS, a write enable signal WE, an output enable signal OE.

With the above-described structure, the data storage device 400 of the present embodiment operates as described below with reference to FIGS. 12 and 13.

Figure 12:
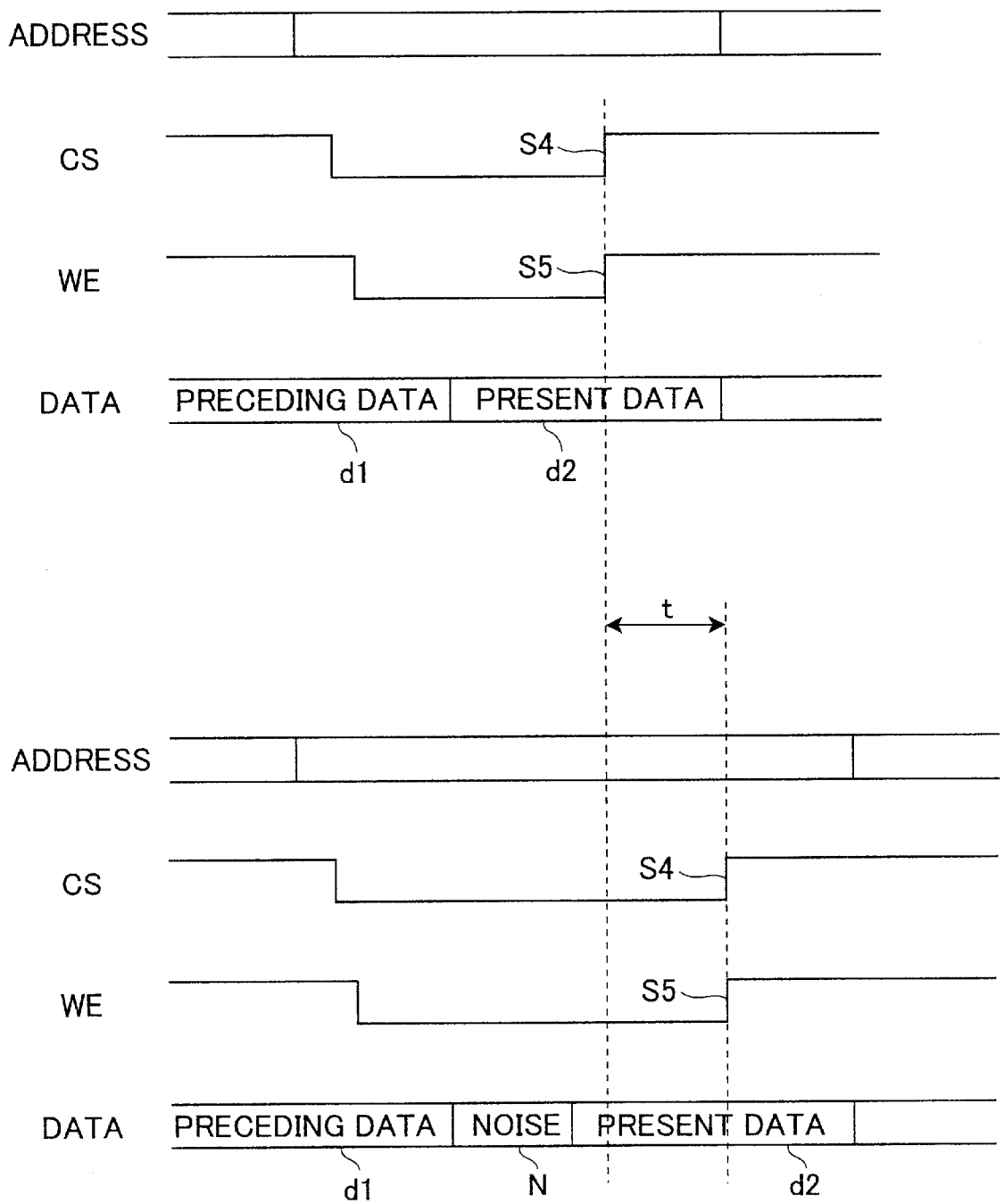
FIG. 12 shows a pair of timing charts showing output timings of an address signal, chip select signal CS, write enable signal WE, and data when desiring to write data according to the fourth embodiment, wherein the upper section of FIG. 12 shows a timing chart when a delay request signal is not outputted and the lower section of FIG. 12 shows a timing chart when a delay request signal is outputted.

FIG. 12 shows the timing charts how the SRAM 80 is written with data outputted from the CPU 10. In FIG. 12, an upper section indicates a case where the comparator 431 outputs no delay request signal to the memory controller 433, and a lower section indicates the other case where the comparator 431 outputs a delay request signal to the memory controller 433.

More specifically, in the case of the upper section, the comparator 431 does not output any delay request signal. That is, the upper section in FIG. 12 is the timing chart showing how an address signal, chip select signal CS, write enable signal WE, and data (present data "d2") is outputted during a normal time when the comparator 431 outputs no delay request signal. The lower section in FIG. 12 is the timing chart showing how the address signal, chip select signal CS, write enable signal WE, and data (present data "d2") is outputted when the comparator 431 outputs a delay request signal.

In order to write data to the SRAM 80, data is first outputted from the CPU 10 to the memory controller 433. The data is then outputted from the memory controller 433, and is written to the SRAM 80 when both the chip select signal CS and the write enable signal WE are brought into the active state (low state). The written data is finally held when the chip select signal CS rises to the high (inactive) state at timing S4 and the write enable signal WE rises to the high (inactive) state at timing S5.

As shown in the upper section of FIG. 12, normally, the rising edge S4 of the chip select CS and the rising edge S5 of the write enable WE are set as appropriate for the SRAM 80 to write data and to hold the written data. When a delay request signal is supplied from the comparator 431, the rising edge S4 of the chip elect CS and the rising edge S5 of the write enable WE are delayed by the delay time "t" as shown in the lower section of FIG. 12.

As shown in the lower section of FIG. 12, noise N possibly occurs n data when data changes in many bits from preceding data "d1" to the present data "d2." In this case, the rising edge S4 of the chip select CS and the rising edge S5 of the write enable WE can be shifted from the timing when the noise N occurs. Thus, the noise N vanishes before the present data is written to and held in the SRAM 80. The SRAM 80 can therefore be written with accurate data not influenced from the noise N.

Figure 13:
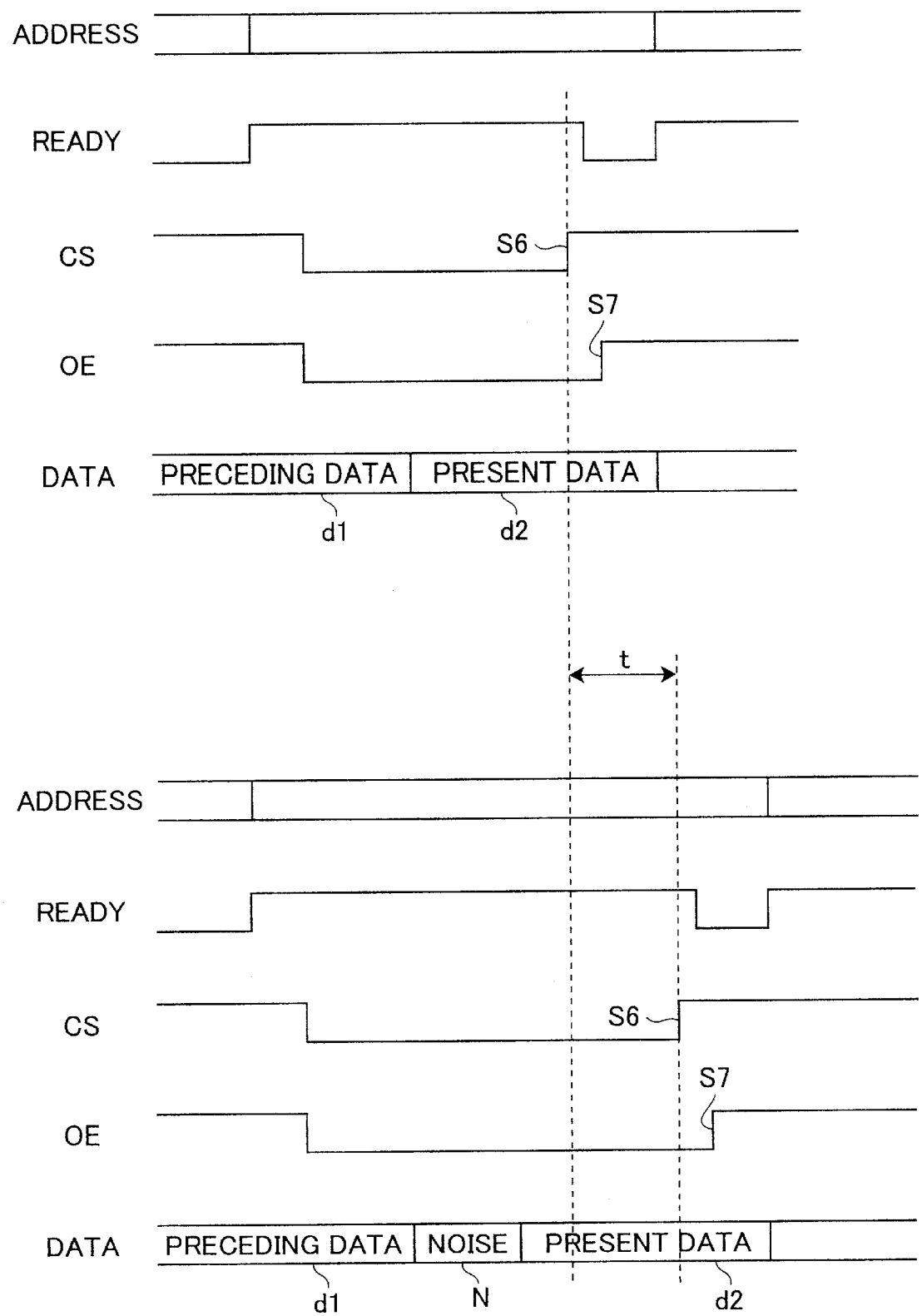
FIG. 13 shows a pair of timing charts showing output timings of an address signal, chip select signal CS, output enable signal OE, and data when desiring to read data according to the fourth embodiment, wherein the upper section of FIG. 13 shows a timing chart when a delay request signal is not outputted and the lower section of FIG. 13 shows a timing chart when a delay request signal is outputted.

FIG. 13 shows the timing charts how data is outputted from the SRAM 80 to be read by the CPU 10. In FIG. 13, an upper section indicates a case where the comparator 431 outputs no delay request signal to the memory controller 433, and a lower section indicates the other case where the comparator 431 outputs a delay request signal to the memory controller 433.

More specifically, in the case of the upper section, the comparator 431 does not output any delay request signal. That is, the upper section in FIG. 13 is the timing chart showing how address signal, ready signal READY, chip select signal CS, output enable signal OE, and data (present data "d2") is outputted during a normal time when the comparator 431 outputs no delay request signal. The lower section in FIG. 13 is the timing chart showing how the address signal, ready signal READY, chip select signal CS, output enable signal OE, and data (present data "d") is outputted when the comparator 431 outputs a delay request signal.

In order to allow the CPU 10 to read data from the SRAM 80, the SRAM 80 continuously outputs data on the data bus 451 at least until either the rising edge S6 of the chip select signal CS or the rising edge S7 of the output enable signal OE that occurs first.

As shown in the upper section of FIG. 13, normally, the rising edge S6 of the chip select CS or the rising edge S7 of the output enable OE is set as appropriate for reading data from the SRAM 80. When a delay request signal is supplied from the comparator 431, the rising edge S6 of the chip select CS and the rising edge S7 of the output enable OE are delayed by the delay time "t" as shown in the lower section of FIG. 13.

As shown in the lower section of FIG. 13, noise N possibly occurs in data when many bits change in the data from preceding data "d1" to the present data "d2." In this case, the rising edge S6 of the chip select CS and the rising edge S7 of the output enable OE can be shifted from the timing when the noise N occurs. The rising edges S6 and S7 can be shifted to the timing when the present data becomes stable. Thus, the noise N vanishes before data is read from the SRAM 80 to the CPU 10. It is possible to prevent inaccurate data from being read from the SRAM 80 due to the noise N.

As shown in FIG. 11, the comparator 431 in the address control circuit 430 of the present embodiment is connected to the CPU 10 via a control bus 452. With this structure, the comparator 431 can receive the reference value setting signal, the reference bit pattern setting signal, and the comparative bit setting signal from the CPU 10 in the same manner as in the first and third embodiments. Accordingly, it is possible to easily change the reference value, the reference bit patterns, and the bits of data subjected to be compared by the comparator 431 in accordance with the actual use.

As described above, according to the present embodiment, the comparator 431 in the address control circuit 430 compares the present data, presently inputted to or outputted from the CPU 10, with the preceding data that is being presently maintained in the maintaining portion 432. When the number of bits, at which the present data changes from the preceding data, is greater than or equal to the reference value, and when the bit pattern in the present data coincides with the reference bit pattern, the rising edge timing of the control signals, which are outputted from the memory controller 433 to the SRAM 80, are delayed, whereby the data input/output timing of the SRAM 80 is delayed. More specifically, when desiring to write data, the rising edge timing of the chip select signal CS and the write enable signal WE are delayed, whereby the data input timing of the SRAM 80 is delayed. When desiring to read data, the rising edge timing of the chip select signal CS and the output enable signal OE are delayed, whereby the data output timing of the SRAM 80 is delayed. Even when all the bits in the data change and therefore noise occurs, error will not occur in the input or output of data.

As described above, according to the above-described embodiments, at least one bit in at least the predetermined portion of all the bits constituting the present bus signal, that is inputted/outputted between the main processing circuit and the subsidiary processing circuit at a present time, is compared with at least one bit in at least the predetermined portion of all the bits constituting the preceding bus signal, that is inputted/outputted between the main processing circuit and the subsidiary processing circuit at a preceding time. When the compared result shows that the predetermined difference exists between the preceding bus signal and the present bus signal, the signal control circuit delays outputting the control signal to the subsidiary processing circuit. Accordingly, the control signal can be outputted to the subsidiary processing circuit after the noise, that occurs when the preceding bus signal changes to the present bus signal, vanishes. It is therefore possible to prevent the subsidiary processing circuit from being inputted with Inaccurate bus signals due to the occurrence of noise, and to prevent the subsidiary processing circuit from outputting/inputting inaccurate bus signals. High speed and accurate input/output operation of bus signals can be achieved between the main processing circuit and the subsidiary processing circuit.

The signal control circuit delays outputting the control signal when the at least one bit, at which at least the predetermined portion of the present bus signal changes from at least the predetermined portion of the preceding bus signal, has a bit pattern coinciding with the reference bit pattern. Accordingly, it is ensured that the signal control circuit can delay outputting the control signal so that the input/output operation of the bus signal will not be influenced from noise that occurs when the bus signal changes from the preceding bus signal to the present bus signal. The subsidiary processing circuit can therefore perform input/output operation of bus signals without being influenced from noise.

The signal control circuit delays outputting the control signal when the number of bits, at which at least the predetermined portion of the present bus signal changes from at least the predetermined portion of the preceding bus signal, is greater than or equal to the reference value. Accordingly, it is ensured that the signal control circuit can delay outputting the control signal so that the input/output operation of bus signal will not be influenced from noise that occurs when the bus signal changes from the preceding bus signal to the present bus signal. The subsidiary processing circuit can therefore perform input/output operation of bus signals without being influenced from noise.

Especially when the signal control circuit delays outputting the control signal when all the bits in the predetermined portion of the present bus signal change from the predetermined portion of the preceding bus signal, the signal control circuit can reliably delay outputting the control signal so that the input/output operation of bus signal will not be influenced from noise that occurs when the bus signal changes from the preceding bus signal to the present bus signal. The subsidiary processing circuit can therefore perform input/output operation of bus signals without being influenced from the noise.

Especially when the reference bit pattern is changed based on the reference bit pattern setting signal inputted from outside, the reference bit pattern can be easily changed as appropriate for the actual use even after the signal control circuit is constructed.

Especially when the reference value is changed based on the reference value setting signal inputted from outside, the reference value can be easily changed as appropriate for the actual use even after the signal control circuit is constructed.

Especially when the delay time amount of the control signal is changed based on the delay time setting signal inputted from outside, the delay time amount can be easily changed as appropriate for the actual use even after the signal control circuit is constructed. Thus, the signal control circuit can be used in cooperation with various types of the main processing circuit and the subsidiary processing circuit.

Based on the bit setting signal inputted from outside, the signal control circuit of the third embodiment can change: bits, in all the bits of the preceding bus signal, to be compared with the present bus signal by the comparing portion; and bits, in all the bits of the present bus signal, to be compared with the preceding bus signal by the comparing portion. Even after the signal control circuit is constructed, bits to be subjected to the comparing operation can be selected and set as appropriate for the actual use. With this control, the signal control circuit can be used in cooperation with various types of the main processing circuit and the subsidiary processing circuit.

Especially when the signal control circuit is used for controlling the dynamic RAM, the comparing portion compares, with each other, predetermined portions of two address signals (row address and/or column address) that are successively outputted from the signal control circuit to the dynamic RAM. When the predetermined difference occurs between the two address signals, the output control portion delays outputting the control signal from the signal control circuit to the dynamic RAM. Even when many bits change simultaneously between the two successive series of address signals, that are outputted from the signal control circuit to the dynamic RAM, and noise occurs in the address signals accordingly, the signal control circuit can output the control signal to the dynamic RAM after the noise vanishes. Accordingly, the dynamic RAM can read address signal, i.e., the row address and column address after the noise vanishes. It is therefore possible to prevent the dynamic RAM from being designated with erroneous addresses.

When the column address included in the present address signal is outputted next to the row address included in the same present address signal, the comparing portion compares each bit in at least the predetermined portion of the column address with a corresponding bit in at least the predetermined portion of the row address. When the column address included in the present address signal is outputted next to the column address included in the preceding address signal, the comparing portion compares each bit in at least the predetermined portion of the column address in the present address signal with a corresponding bit in at least the predetermined portion of the column address in the preceding address signal. In accordance with any output order in which the row address and the column address are outputted, the control signal can be delayed ensurely.

While the invention has been described in detail with reference to the specific embodiments thereof, it would be apparent to those skilled in the art that various changes and modifications may be made therein without departing from the spirit of the invention.

In each of the above-described embodiments, DRAM or SRAM is used as the memory circuit. However, the present invention is not limited to the above-described embodiments, but can be applied to other various devices that employ other various memory circuits such as ROM.

In each of the above-described embodiments, the subsidiary processing circuit is comprised of the memory circuit. However, the present invention is not limited to the above-described embodiments, but can be applied to other various devices that employ other various circuits, such as input/output circuits, as the subsidiary processing circuit.

In the data storage device of the first through third embodiments, the address control circuit controls output timings of address signals. In the data storage device of the fourth embodiment, the data control circuit controls input/output timings of data. However, the data storage device of the present invention may be provided with both the address control circuit and the data control circuit. Such a data storage device can simultaneously control both the output timings of address signals and the input/output timings of data.

In each of the first through third embodiments, the address control circuit 30 (330) is realized in the form of ASIC. In the fourth embodiment, the data control circuit 430 is realized in the form of ASIC. However, the present invention is not limited to the above-described embodiments. That is, the address control circuit or the data control circuit may be provided within the CPU 10. More specifically, the address control circuit or the data control circuit may be mounted in the CPU 10 as a circuit for being used exclusively to control address or data. The address control circuit or the data control circuit may be realized in the form of a software program.

In the first embodiment, the address control circuit 30 performs address designation operation onto the DRAM 20 of the page mode type. However, the present invention is not limited to this structure. The present invention can be applied to the address control circuit for designating addresses in DRAMS of the normal mode type, nibble mode type.

The number of bits located in the address signal and the number of bits located in the data signal may not be limited to those described in the above-described embodiments.

In each of the above-described embodiments, the comparator 31 (331, 431) performs the comparing judging process to compare the present bus signal with the preceding bus signal, and performs: the judgment (1) to judge whether the number of bits, at which the present bus signal is different from the preceding bus signal, is greater than or equal to the reference value; and the judgment (2) to judge whether the change of the bus signal from the preceding bus signal into the present bus signal coincides either one of the reference bit patterns recorded in the reference bit pattern table P. When both of the conditions (1) and (2) are satisfied, the comparator 31 (331, 431) outputs the delay request signal. However, the present invention is not limited to the above-described control. The comparator 31 (331, 431) may output the delay request signal only when either one of the conditions (1) and (2) is satisfied.

For example, as in the flowchart of FIG. 2, when desiring to judge only condition (1), the process of S6, S7, S12, or S13 is not executed. According to this control, the number of times, that the delay request signal is outputted, will increase in comparison with the case where the judgment (2) is also executed to compare the bus signal with the reference bit patterns. However, it is still possible to prevent the memory circuit from being written with data at inaccurate addresses.

On the other hand, when desiring to judge only condition (2), the process of S4, S5, S10, or S11 is not executed. In order to actually construct the signal control circuit to perform this judgment operation, it is necessary to consider the capacity of the reference bit pattern table P and the time period required to perform the comparing judging process. Because it is necessary to restrict the memory capacity for the reference bit pattern table P and also to restrict the period of time taken by the judging operation, the number of the reference bit patterns, to be compared with the actual bus signal, has to be limited to a smaller value in comparison with the case where the judgment (1) is executed before the judgment (2) is executed. Accordingly, this modification can cope with changes in the bus signal only in the limited small number of change patterns. However, it is still possible to output a delay request signal when the bus signal changes in the predetermined change patterns.

In the third embodiment, control is attained to delay the timing for changing the control signal, such as the signal CS, into the active state. However, the present invention is not limited to this control. For example, the present invention can attain the time delaying operation through increasing the time period, during which each signal remains active.

For example, during the data writing mode for the SRAM 80 of the third embodiment, an address signal will not become stable or fixed while noise N occurs in the address signal. Accordingly, if the active period of time for each control signal, such as the signals CS and WE, is set as fixed, the predetermined set up period "ts" may not be possibly ensured until the signal WE rises to write data. Accordingly, it is preferable to increase the active time period for each control signal. It becomes possible to ensure the set up time period "ts" while preventing data from being written onto inaccurate addresses.

What is claimed is:

1. A signal control circuit for outputting, to a subsidiary processing circuit, control signals for controlling input and output of bus signals with respect to the subsidiary processing circuit, the bus signals being transferred via a bus between the subsidiary processing circuit and a main processing circuit, the signal control circuit comprising:

a comparing portion that compares at least a bit in at least a predetermined portion of a present bus signal, which is transferred between a main processing circuit and a subsidiary processing circuit at a present timing with corresponding at least a bit in at least a predetermined portion of a preceding bus signal, which is transferred between the main processing circuit and the subsidiary processing circuit at a preceding timing, the comparing portion outputting a delay request signal when the compared result shows that a predetermined difference occurs between the present bus signal and the preceding bus signal; and an output control portion that outputs, to the subsidiary processing circuit, a control signal for controlling input and output of the present bus signal, the output control portion outputting the control signal at a predetermined timing when the compared result shows that the predetermined difference does not occur between the present bus signal and the preceding bus signal, the output control portion delaying the timing of output of the control signal from the predetermined timing when the output control portion receives the delay request signal indicative of the compared result that the predetermined difference occurs between the present bus signal and the preceding bus signal, thereby preventing the input and output of the present bus signal from being influenced from noise that occurs when the bus signal changes from the preceding bus signal into the present bus signal while occurring the predetermined difference.

2. A signal control circuit as claimed in claim 1, wherein the output control portion delays the output of the control signal when at least one bit in the at least the predetermined portion of the present bus signal has a bit pattern coinciding with a predetermined reference bit pattern.

3. An improvement to a processor for performing a block floating point FFT on a plurality of data values, the processor executing a program, the processor including an execution unit, an FFT block floating point bit, a compare absolute value unit, a scale down by 2 unit, a scale-before-store bit, and an FFT sticky status bit, the improvement comprising an FFT compare register, said FFT compare register operative to contain a programmable comparison constant which is loadable under control of the program.

4. A method for performing a block floating point FFT on a plurality of data values having absolute values utilizing a processor executing a program, the processor including an execution unit, a compare absolute value unit, a scale down by 2 unit, a scale-before-store bit for enabling a scale-before-store mode, a user-loadable FFT compare register, and an FFT sticky status bit, the method comprising the steps of:

(a) activating, if the scale-before-store mode is enabled, the scale down by 2 unit;
   (b) comparing each of the plurality of data values with the FFT compare register;
   (c) setting, if a data value absolute value is not less than the FFT compare register, the FFT sticky status bit; and
   (d) enabling, if the FFT sticky status bit is set, the scale-before-store mode.

5. The method as in claim 4, wherein the processor further includes a rounding unit for performing a rounding operation and a rounding adjustment, the method further comprising the steps of:

(e) if the scale-before-store mode is not enabled: adding the rounding adjustment to the data values, by the rounding unit; and
   (f) if the scale-before-store mode is enabled: adding twice the rounding adjustment to the data values, by the rounding unit.

6. The method as in claim 4, wherein said enabling of the scale-before-store mode is effected by setting the scale-before-store bit.

7. A signal control circuit as claimed in claim 1, further comprising a delay time period changing portion that changes a period of delay time, by which the output control portion delays the output of the control signal, based on a delay time period setting signal inputted from outside.

8. A signal control circuit as claimed in claim 1, further comprising a comparing bit changing portion that changes, based on a bit setting signal inputted from outside, at least one bit in the preceding bus signal and at least one bit in the present bus signal as subjects to be compared by the comparing portion.

9. A signal control circuit, provided between a main processing circuit for outputting an address signal to designate an address and a dynamic RAM that performs data reading operation and data writing operation to the address designated by the address signal outputted from the main processing circuit, the signal control circuit being for receiving the address signal from the main processing circuit, for dividing the address signal into row address and column address, for outputting the row address and column address in a predetermined order to the dynamic RAM while outputting, to the dynamic RAM, a control signal for controlling timings when the dynamic RAM reads the row address and the column address, the control signal circuit comprising:

a comparing portion that compares, when column address, included in a present address signal outputted from the main processing circuit at a present time, is to be outputted subsequent to row address included in the present address signal, each bit at least in a predetermined portion of the column address with a corresponding bit at least in the predetermined portion of the row address, and that compares, when column address, included in the present address signal, is to be outputted subsequent to another column address included in a preceding address signal that is outputted from the main processing circuit at a preceding time, each bit at least in a predetermined portion of the column address included in the present address signal with a corresponding bit at least in the predetermined portion of the column address included in the preceding address signal, the comparing portion outputting a delay request signal when a predetermined difference occurs between the compared addresses; and an output control portion that outputs, at a predetermined timing, a control signal for controlling the timing when the dynamic RAM reads the column address in the present address signal when the compared results show that the predetermined difference does not occur between the addresses compared by the comparing portion, the output control portion delaying, from the predetermined timing, the timing for outputting the control signal when the output control portion receives the delay request signal indicating that the predetermined difference occurs between the addresses compared by the comparing portion, thereby preventing the reading operation of the column address in the present address signal from being influenced from noise that occurs when the address changes from the row address in the present address signal into the column address in the present address signal while occurring the predetermined difference and from noise that occurs when the address changes from the column address in the preceding address signal into the column address in the present address signal while occurring the predetermined difference.

10. A signal control system, comprising:

a main processing circuit for mainly processing a bus signal;

a subsidiary processing circuit capable of communicating the bus signals with the main processing circuit via a bus; and a signal control circuit, provided between the main processing circuit and the subsidiary processing circuit, the signal control circuit including:

means for receiving the bus signals that are successively inputted to or outputted from the subsidiary processing circuit, and means for outputting control signals to the subsidiary processing circuit, thereby controlling at least one of input and output of the bus signals to and from the subsidiary processing circuit; and means for comparing at least a predetermined portion in all of a plurality of bits constituting a present bus signal, which is inputted to or outputted from the subsidiary processing circuit at a present timing, with at least the predetermined portion in all of a plurality of bits constituting a preceding bus signal, which is inputted to or outputted from the subsidiary processing circuit at a timing preceding to the present timing, the comparing means instructing the control signal outputting means to output, at a predetermined timing, the control signal, for controlling a corresponding one of input and output of the present bus signal, to the subsidiary processing circuit when the compared result shows that a predetermined difference does not occur between the present bus signal and the preceding bus signal, the comparing means outputting a delay request signal to the control signal outputting means to delay, from the predetermined timing, the output of the control signal when the compared result shows that the predetermined difference occurs between the present bus signal and the preceding bus signal, thereby preventing the at least one of input and output operation of the present bus signal from being influenced from noise that occurs when the bus signal changes from the preceding bus signal into the present bus signal while occurring the predetermined difference.

11. A signal control system as claimed in claim 10, wherein the signal control circuit further includes means for maintaining the preceding bus signal, thereby enabling the comparing means to compare the present bus signal with the preceding bus signal.

12. A signal control system as claimed in claim 11, wherein the comparing means includes:
   means for storing a predetermined reference bit pattern;
   means for judging whether or not at least one bit in at least the predetermined portion of the present bus signal has a bit pattern coinciding with the predetermined reference bit pattern; and
   means for controlling the control signal outputting means to delay output of the control signal when the at least one bit has the bit pattern coinciding with the predetermined reference bit pattern.

13. A signal control system as claimed in claim 12, wherein the judging means judges whether or not at least one bit in at least the predetermined portion of the present bus signal has the bit pattern coinciding with the predetermined reference bit pattern.

14. A signal control system as claimed in claim 11, wherein the comparing means includes:
   means for storing a predetermined reference value;
   means for judging whether or not the number of bits, at which at least the predetermined portion of the bus signal changes from the preceding bus signal to the present bus signal, is greater than or equal to the predetermined reference value; and
   means for controlling the control signal output means to delay output of the control signal when the number of the changing bits is greater than or equal to a predetermined reference value.

15. A signal control system as claimed in claim 11, wherein the comparing means includes:
   means for judging whether or not all the bits constituting the predetermined portion of the present bus signal are different from the corresponding all the bits constituting the predetermined portion of the preceding bus signal; and
   means for controlling the control signal output means to delay output of the control signal when all the bits of the predetermined portion change from the preceding bus signal to the present bus signal.

16. A signal control system as claimed in claim 12, wherein the main processing circuit includes means for outputting preference bit pattern setting signal, and
   wherein the comparing means further includes means for changing the predetermined reference bit pattern based on the reference bit pattern setting signal inputted from the main processing circuit.

17. A signal control system as claimed in claim 14, wherein the main processing circuit further includes means for outputting a reference value setting signal, and
   wherein the comparing means further includes means for changing the predetermined reference value based on the reference value setting signal inputted from the main processing circuit.

18. A signal control system as claimed in claim 11, wherein the main processing circuit further includes means for outputting a delay time period setting signal, and wherein the control signal output means further includes means for changing a period of delay time, by which output of the control signal is delayed, based on the delay time period setting signal inputted from the main processing circuit.

19. A signal control system as claimed in claim 11, wherein the main processing circuit further includes means for outputting,a bit setting signal, and
   wherein the comparing means further includes means for changing, based on the bit setting signal inputted from the main processing circuit, the predetermined portion in each of the preceding bus signal and the present bus signal to be compared by the comparing means.

20. A signal control system as claimed in claim 11, wherein the main processing circuit successively outputs, via an address bus, address signals designating desired addresses,
   wherein the subsidiary processing circuit includes a memory circuit that is capable of performing data reading operation and data writing operation at addresses designated by the successively-outputted address signals,
   wherein the bus signal receiving means receives, via the address bus, the address signals, that are successively outputted from the address bus, data of addresses indicated by the address signals to the subsidiary processing circuit;
   wherein the control signal output means outputs control signals to the subsidiary processing circuit, thereby controlling the subsidiary processing circuit to read the address-indicating data via the address bus, and
   wherein the comparing means compares present address-indicating data, that is to be outputted to the subsidiary processing circuit at a present timing, with preceding address-indicating data, that is to be outputted to the subsidiary processing circuit at a timing preceding to the present timing, the comparing means instructing the control signal outputting means to output, at a predetermined timing, the control signal, for controlling reading of the present address-indicating data, to the subsidiary processing circuit when the compared result shows that a predetermined difference does not occur between the present address-indicating data and the preceding address-indicating data, the comparing means instructing the control signal outputting means to delay, from the predetermined timing, the output of the control signal when the compared result shows that the predetermined difference occurs between the present address-indicating data and the preceding address-indicating data, thereby preventing the reading operation of the present address-indicating data from being influenced from noise that occurs when the address-indicating data changes from the preceding address-indicating data into the present address-indicating data while occurring the predetermined difference.

21. A signal control system as claimed in claim 20,
   wherein the bus signal receiving means outputs the address-indicating data constructed from at least one bit in all of a plurality of bits in the received bus signal, and
   wherein when the bus signal receiving means outputs a present address-indicating data, that is constructed from at least one bit in a predetermined portion of a present bus signal outputted from the main processing circuit at a present timing, next to the preceding address-indicating data, that is constructed from at least one bit in the predetermined portion of a preceding bus signal outputted form the main processing circuit at a timing preceding to the present timing, the comparing means compares the at least one bit in the present address signal with the at least one bit in the preceding address signal.

22. A signal control system as claimed in claim 21, wherein when the bus signal receiving means outputs the present address-indicating data next to the preceding address-indicating data, that is constructed from at least one bit in another predetermined portion of the present bus signal, the comparing means compares the at least one bit in the predetermined portion of the present address signal with the at least one bit in the other predetermined portion of the present address signal.

23. A signal control system as claimed in claim 11, wherein the main processing circuit is capable of successively communicating data with the subsidiary processing circuit via a data bus, wherein the subsidiary processing circuit includes a memory circuit that is capable of receiving, via the data bus, a plurality of sets of data transferred from the main processing circuit to write the received data therein, and that is capable of successively outputting, via the data bus, a plurality of sets of data to the main processing circuit, wherein the bus signal receiving means receives, via the data bus, the plurality of sets of data that are successively transferred between the main processing circuit and the subsidiary processing circuit;

wherein the control signal output means outputs control signals to the subsidiary processing circuit, thereby controlling the subsidiary processing circuit to perform the writing operation when the plurality of sets of data are successively outputted from the main processing circuit and controlling the subsidiary processing circuit to perform the outputting operation when the plurality of sets of data are successively outputted from the subsidiary processing circuit, and wherein the comparing means compares at least a predetermined portion in all of a plurality of bits constituting a present set of data, which is inputted to or outputted from the subsidiary processing circuit at a present timing, with at least the predetermined portion in all of a plurality of bits constituting a preceding set of data, which is inputted to or outputted from the subsidiary processing circuit at a timing preceding to the present timing, the comparing means instructing the control signal outputting means to output, at a predetermined timing, the control signal, for controlling one of a timing of the outputting operation of the present set of data when the present set of data is outputted from the subsidiary processing circuit and a timing of the writing operation of the present set of data when the present set of data is outputted from the main processing circuit, to the subsidiary processing circuit when the compared result shows that a predetermined difference does not occur between the present data set and the preceding data set, the comparing means instructing the control signal outputting means to delay, from the predetermined timing, the output of the control signal when the compared result shows that the predetermined difference occurs, thereby preventing the one of the inputting operation and the outputting operation of the present data set from being influenced from noise that occurs when the data set changes from the preceding data set into the present data set while occurring the predetermined difference.

24. A dynamic Ram control system, comprising:

a main processing circuit for outputting an address signal to designate an address;

a dynamic RAM that performs data reading operation and data writing operation to the address designated by the address signal outputted from the main processing circuit; and a signal control circuit, provided between the main processing circuit and the dynamic RAM, for receiving the address signal from the main processing circuit, the signal control circuit including:

means for receiving address signals successively outputted from main processing circuit, for dividing each received address signal into row address and column address, for outputting at least one of the row address and the column address in a predetermined order to dynamic RAM, while outputting, to the dynamic RAM, a control signal for controlling a timing when the dynamic RAM reads the outputted at least one of the row address and the column address; and means for, when the output means outputs column address, included in a present address signal that is received from the main processing circuit at a present time, next to row address included also in the present address signal, comparing each bit at least in a predetermined portion of the column address with a corresponding bit at least in the predetermined portion of the row address, and for, when the output means outputs column address, included in the present address signal, next to another column address including in a preceding address signal that is outputted from the main processing circuit at a timing preceding to the present timing, comparing each bit at least in a predetermined portion of the column address included in the present address signal with a corresponding bit at least in the predetermined portion of the column address included in the preceding address signal, the comparing means failing to output a delay request signal to the output means when the compared results show that a predetermined difference does not occur between the addresses compared by the comparing portion, thereby controlling the output means to output, at a predetermined timing, the control signal for controlling a timing when the dynamic RAM is to read the column address that is included in the present address signal, the comparing means outputting the delay request signal to the output means when the compared results show that the predetermined difference occurs between the addresses compared by the comparing portion, thereby controlling the output means to delay, from the predetermined timing, the output of the control signal, thereby preventing the reading operation of the column address in the present address signal from being influenced from noise that occurs when the address changes from the row address in the present address signal into the column address in the present address signal while occurring the predetermined difference and from noise that occurs when the address changes from the column address in the preceding address signal into the column address in the present address signal while occurring the predetermined difference.

25. A dynamic RAM control system as claimed in claim 24, wherein the signal control circuit further includes means for maintaining the preceding address signal, thereby enabling the comparing means to perform the comparing operation.

* * * * *